(12) United States Patent
Albert et al.

(10) Patent No.: US 7,546,629 B2
(45) Date of Patent: Jun. 9, 2009

(54) SYSTEM AND METHODOLOGY FOR SECURITY POLICY ARBITRATION

(75) Inventors: Anthony Albert, San Francisco, CA (US); Kyle Kawamura, San Francisco, CA (US); Keith Haycock, San Francisco, CA (US); Conrad Herrmann, Oakland, CA (US)

(73) Assignee: Check Point Software Technologies, Inc., Redwood City, CA (US)

( * ) Notice: Subject to any disclaimer, the term of this patent is extended or adjusted under 35 U.S.C. 154(b) by 1372 days.

(21) Appl. No.: 10/159,820

(22) Filed: May 31, 2002

(65) Prior Publication Data

US 2003/0177389 A1 Sep. 18, 2003

Related U.S. Application Data

(60) Provisional application No. 60/362,525, filed on Mar. 6, 2002.

(51) Int. Cl.
*H04K 1/00* (2006.01)
*H04L 9/00* (2006.01)
*G06F 17/00* (2006.01)

(52) U.S. Cl. .............................. 726/1; 726/11; 726/12; 726/13; 726/14; 726/15; 709/223

(58) Field of Classification Search ..................... 726/1, 726/2, 11–15; 709/223
See application file for complete search history.

(56) References Cited

U.S. PATENT DOCUMENTS

| | | | |
|---|---|---|---|
| 4,914,586 A | 4/1990 | Swinehart et al. | 707/101 |
| 5,475,817 A | 12/1995 | Waldo et al. | 709/316 |
| 5,586,260 A | 12/1996 | Hu | 713/201 |
| 5,623,601 A | 4/1997 | Vu | 713/201 |
| 5,764,887 A | 6/1998 | Kells et al. | 713/200 |
| 5,815,574 A | 9/1998 | Fortinsky | 713/153 |
| 5,828,833 A | 10/1998 | Belville et al. | 713/201 |
| 5,832,211 A | 11/1998 | Blakley et al. | 713/202 |
| 5,838,903 A | 11/1998 | Blakely et al. | 713/202 |
| 5,857,191 A | 1/1999 | Blackwell et al. | 707/10 |
| 5,864,665 A | 1/1999 | Tran | 713/201 |
| 5,875,296 A | 2/1999 | Shi et al. | 713/202 |
| 5,881,230 A | 3/1999 | Christensen et al. | 709/203 |
| 5,950,195 A * | 9/1999 | Stockwell et al. | 707/4 |
| 5,968,176 A | 10/1999 | Nessett et al. | 713/201 |
| 5,983,350 A | 11/1999 | Minear et al. | 713/201 |
| 5,987,611 A * | 11/1999 | Freund | 726/4 |
| 5,996,077 A | 11/1999 | Williams | 713/201 |
| 6,098,173 A | 8/2000 | Elgressy et al. | 713/201 |
| 6,134,327 A | 10/2000 | Van Oorschot | 380/30 |
| 6,158,010 A | 12/2000 | Moriconi et al. | 713/201 |
| 6,212,558 B1 | 4/2001 | Antur et al. | 709/221 |
| 6,321,334 B1 | 11/2001 | Jerger et al. | 713/200 |
| 6,330,562 B1 | 12/2001 | Boden et al. | 707/10 |

(Continued)

*Primary Examiner*—Christopher A Revak
*Assistant Examiner*—Trang Doan
(74) *Attorney, Agent, or Firm*—John A. Smart

(57) ABSTRACT

A system providing methods for a device to apply a security policy required for connection to a network is described. In response to receipt of a request from a device for connection to a particular network, a current policy to apply to said device for governing the connection to this particular network is determined from a plurality of available security policies available to the device. This current policy to apply to said device is generated by merging a plurality of security policies available for governing connections. After said current policy is applied to the device, the connection from the device to this particular network is allowed to proceed.

51 Claims, 6 Drawing Sheets

U.S. PATENT DOCUMENTS

| | | |
|---|---|---|
| 6,345,361 B1 | 2/2002 | Jerger et al. ................. 713/200 |
| 6,351,816 B1 | 2/2002 | Mueller et al. .............. 713/201 |
| 6,393,474 B1 | 5/2002 | Eichert et al. ............... 709/223 |
| 6,438,695 B1 * | 8/2002 | Maufer ........................ 726/11 |
| 6,449,723 B1 | 9/2002 | Elgressy et al. ............. 713/201 |
| 6,453,419 B1 | 9/2002 | Flint et al. .................. 713/201 |
| 6,466,932 B1 | 10/2002 | Dennis et al. .................. 707/3 |
| 6,473,800 B1 | 10/2002 | Jerger et al. ................. 709/226 |
| 6,480,962 B1 | 11/2002 | Touboul ...................... 713/200 |
| 6,484,261 B1 * | 11/2002 | Wiegel ........................ 726/11 |
| 6,490,679 B1 | 12/2002 | Tumblin et al. ............. 713/155 |
| 6,499,110 B1 | 12/2002 | Moses et al. ................ 713/201 |
| 6,510,513 B1 | 1/2003 | Danieli ....................... 713/156 |
| 6,526,513 B1 | 2/2003 | Shrader et al. ............... 713/200 |
| 6,539,483 B1 * | 3/2003 | Harrison et al. ................ 726/1 |
| 6,553,498 B1 * | 4/2003 | Elgressy et al. ............... 726/23 |
| 6,578,076 B1 * | 6/2003 | Putzolu ....................... 709/223 |
| 6,598,057 B1 | 7/2003 | Synnestvedt et al. ........ 370/352 |
| 6,643,776 B1 | 11/2003 | Boden et al. ................. 709/224 |
| 6,738,908 B1 * | 5/2004 | Bonn et al. ..................... 726/4 |
| 6,826,698 B1 * | 11/2004 | Minkin et al. ................... 726/1 |
| 6,832,321 B1 * | 12/2004 | Barrett ........................ 726/11 |
| 6,975,602 B2 * | 12/2005 | Anderson ................... 370/328 |
| 7,139,837 B1 * | 11/2006 | Parekh et al. ............... 709/238 |
| 2003/0097590 A1 * | 5/2003 | Syvanne ..................... 713/201 |
| 2003/0135504 A1 * | 7/2003 | Elvanoglu et al. ........... 707/100 |

\* cited by examiner

SYSTEM AND METHODOLOGY FOR SECURITY POLICY ARBITRATION

RELATED APPLICATIONS

The present application is related to and claims the benefit of priority of the following commonly-owned provisional application(s): application Ser. No. 60/362,525, filed Mar. 6, 2002, entitled "System and Methodology for Security Policy Arbitration", of which the present application is a non-provisional application thereof. The present application is related to the following commonly-owned application(s): application Ser. No. 09/944,057, filed Aug. 30, 2001, entitled "System Providing Internet Access Management with Router-based Policy Enforcement". The disclosures of each of the foregoing applications are hereby incorporated by reference in their entirety, including any appendices or attachments thereof, for all purposes.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

1. Field of the Invention

The present invention relates generally to information processing and, more particularly, to systems and methods for maintaining security of computer systems connected to one or more networks (Local Area Networks or Wide Area Networks) and reconciling multiple security policies that may apply to computer systems from time to time.

2. Description of the Background Art

The first computers were largely stand-alone units with no direct connection to other computers or computer networks. Data exchanges between computers were mainly accomplished by exchanging magnetic or optical media such as floppy disks. Over time, more and more computers were connected to each other using Local Area Networks or "LANs". In both cases, maintaining security and controlling what information a computer user could access was relatively simple because the overall computing environment was limited and clearly defined.

In traditional computing networks, a desktop computer largely remained in a fixed location and was physically connected to a single local network via Ethernet. More recently, however, an increasingly large number of business and individual users are using portable computing devices, such as laptop computers, that are moved frequently and that connect into more than one network. For example, many users now have laptop computers that are plugged into a corporate network during the day and are plugged into a home network during the evening. Computers can be connected to networks at home, at work, and in numerous other locations. Many users also have home computers that are remotely connected to various organizations from time to time through the Internet. The number of computing devices, and the number of networks that these devices connect to, has increased dramatically in recent years.

In addition, various different types of connections may be utilized to connect to these different networks. A dial-up modem may be used for remote access to an office network. Various types of wireless connectivity, including IEEE (Institute of Electrical and Electronics Engineers) 802.11 and Bluetooth, are also increasingly popular. Wireless networks often have a large number of different users that are occasionally connected from time to time. Moreover, connection to these networks is often very easy, as connection does not require a physical link. Wireless and other types of networks are frequently provided in cafes, airports, convention centers, and other public locations to enable mobile computer users to connect to the Internet. Increasingly, users are also using the Internet to remotely connect to a number of different systems and networks. For example, a user may connect his or her home computer to a corporate network through a virtual private network (VPN) which creates a secure Internet session between the home computer and the corporation's servers. The user may also connect this same home computer to his or her bank for on-line banking. Thus, it is becoming more common for users to connect to a number of different networks from time to time through a number of different means.

One of the implications of this increasing number of devices occasionally connected to different networks is that traditional corporate firewall technologies are no longer effective. Traditional firewall products guard a boundary (or gateway) between a local network, such as a corporate network, and a larger network, such as the Internet. These products primarily regulate traffic between physical networks by establishing and enforcing rules that regulate access based upon the type of access request, the source requesting access, the connection port to be accessed, and other factors. For example, a firewall may permit access to a particular computer on port 80, but deny remote access to other computers on the network. A firewall may also permit access from a specific IP address or range (or zone) of IP addresses, but deny access from other addresses. Different security rules may be defined for different zones of addresses. However, traditional firewall technology guarding a network boundary does not protect against traffic that does not traverse that boundary. It does not regulate traffic between two devices within the network or two devices outside the network. A corporate firewall provides some degree of protection when a device is connected to that particular corporate network, but it provides no protection when the device is connected to other networks. In addition, a traditional firewall may not protect against intrusions originating from a remote device which is connected to a corporate (or similar) network.

One security measure that has been utilized by many users is to install a personal firewall (or end point security) product on a computer system to control traffic into and out of the system. An end point security product can regulate all traffic into and out of a particular computer. However, in today's Internet connected environment an end user may connect to a number of different networks from time to time. For example, a user with a home computer may connect this machine to his or her bank for on-line banking as well as to his or her Internet service provider. The user may also remotely connect the device to a private network of a corporation, government entity, or similar organization (e.g., through a virtual private network (VPN)). Each of these connections may involve different security concerns.

In the situation where a user remotely connects to a private network through a VPN, the organization operating the private network may require the end user to take steps necessary to protect the security of the private network. One way to increase the security of a private network that permits access by remote users is to provide remote users with end point security software. Security may be further enhanced by requiring users to comply with security policies in connection with obtaining remote access to the private network. An increasing number of corporate and other organizations are putting security policies in place and requiring compliance by remote users in order to secure their networks, infrastructure, and information. As a result, an end user of a computing device may be subject to different security policies and requirements from time to time. For example, an end user may utilize an end point security module to secure his or her device. As part of this effort, the user may adopt certain security settings or policies for security of his or her device as he or she accesses various sites on the Internet. However, when the user opens communication channels to other systems, additional security policies may come into play. For instance, a connection to a bank for on-line banking may require the user to download and apply the bank's required security policies. As a result, an end user may be required to implement a number of different security policies from time to time as he or she connects to different networks, sites, or entities.

Corporations and other organizations permitting access to their networks are increasingly requiring compliance with organizational security policies (hereinafter referred to as "corporate security policies") in order to protect their networks and systems. For example, if a remote user connected to a bank for on-line banking does not apply and properly enforce the bank's required security policies, a hacker could gain unauthorized access to the bank's systems through the remote user's unsecured system. Although a secure VPN connection may be established between the bank and the user in this instance, if the user's system is vulnerable, security of the overall environment may be jeopardized.

To guard against these types of risks, the bank may require an on-line banking user to install particular security software on his or her machine and/or may require particular security policies or settings to be implemented. Current VPN and security technology provides for loading of a particular security policy (e.g., software implementing a particular security policy required by the bank in this example) based upon a particular location (e.g., based upon a specific network connection to the bank). However, this is currently an all or nothing solution. This current solution may, in fact, provide an appropriate level of protection for the bank's systems. However, the result of this current approach is that a user may be forced to implement security policies that are much more restrictive than he or she requires for other activities, such as connecting to an Internet service provider or connecting to other computers in a home network. These restrictions may, in fact, make it more difficult for the user to perform particular tasks that he or she may want to do perform with organizations or entities other than the bank. The set of security policies appropriate for on-line banking may be inappropriate for connecting to other sites for other purposes. On the other hand, if the bank leaves security policies and settings to the sole discretion of the user, the user's preferred security settings may be insufficient to protect the bank's systems.

What is required is a more flexible system in which different security policies and settings are applied depending upon the entities or networks to which a user is connected from time to time. A user may, for example, wish to apply his or her own individual set of security policies in connecting to his or her Internet service provider. However, he or she may also need to comply with other policies as required for other purposes, such as remotely connecting to his or her employer's corporate network or to a bank for on-line banking. Ideally, the solution should also enable multiple security policies to be effectively reconciled and merged as required from time to time. The ability to merge multiple security policies enables required security concerns to be satisfied, while still providing a degree of flexibility to the user. The solution should also be easy to implement and apply, so that the solution may be utilized by a wide range of users, including users with little knowledge of security policies and requirements. The present invention fulfills these and other needs.

GLOSSARY

The following definitions are offered for purposes of illustration, not limitation, in order to assist with understanding the discussion that follows.

End point security: End point security is a way of managing and enforcing security on each computer instead of relying upon a remote firewall or a remote gateway to provide security for the local machine or environment. End point security involves a security agent that resides locally on each machine. This agent monitors and controls the interaction of the local machine with other machines and devices that are connected on a LAN or a larger wide area network (WAN), such as the Internet, in order to provide security to the machine.

Firewall: A firewall is a set of related programs, typically located at a network gateway server, that protects the resources of a private network from other networks by controlling access into and out of the private network. (The term also implies the security policy that is used with the programs.) A firewall, working closely with a router program, examines each network packet to determine whether to forward it toward its destination. A firewall may also include or work with a proxy server that makes network requests on behalf of users. A firewall is often installed in a specially designated computer separate from the rest of the network so that no incoming request can get directly at private network resources.

MD5: MD5 is a message-digest algorithm which takes as input a message of arbitrary length and produces as output a 128-bit "fingerprint" or "message digest" of the input. The MD5 algorithm is used primarily in digital signature applications, where a large file must be "compressed" in a secure manner before being encrypted with a private (secret) key under a public-key cryptosystem. Further description of MDF is available in *RFC 1321: The MD5 Message-Digest Algorithm*, (April 1992), the disclosure of which is hereby incorporated by reference.

Network: A network is group of two or more systems linked together. There are many types of computer networks, including local area networks (LANs), virtual private networks (VPNs), metropolitan area networks (MANs), campus area networks (CANs), and wide area networks (WANs) including the Internet. As used herein, the term network refers broadly to any group of two or more computer systems or devices that linked together from time to time.

Security policy: In general terms, a security policy is an organization's statement defining the rules and practices that regulate how it will provide security, handle intrusions, and recover from damage caused by security breaches. An explicit and well-defined security policy includes a set of rules that are used to determine whether a given subject can be permitted to gain access to a specific object. A security policy may be enforced by hardware and software systems that effectively implement access rules for access to systems and information. Further information on security policies is available in *RFC 2196: Site Security Handbook*, (September 1997), the disclosure of which is hereby incorporated by reference. In this document, "security policy" and "corporate security policy" both refer to a set of security policies and rules employed an individual or by a corporation, government entity, or any other organization operating a network.

SSL: SSL is an abbreviation for Secure Sockets Layer, a protocol developed by Netscape for transmitting private documents over the Internet. SSL works by using a public key to encrypt data that is transferred over the SSL connection. Both Netscape Navigator and Microsoft Internet Explorer support SSL, and many Web sites use the protocol to obtain confidential user information, such as credit card numbers. SSL creates a secure connection between a client and a server, over which data can be sent securely. For further information, see e.g., *The SSL Protocol, version 3.0*, (Nov. 18, 1996) from the Internet Engineering Task Force (IETF), the disclosure of which is hereby incorporated by reference.

Subnet: A subnet is a portion of a network that shares a common address component. On TCP/IP networks, subnets are defined as all devices whose IP addresses have the same prefix. For example, all devices with IP addresses that start with 100.100.100. would be part of the same subnet. Dividing a network into subnets is useful for both security and performance reasons. IP networks are divided using a subnet mask. For purposes of this document, subnet will generally refer to a portion of a network that is served by the same router and to which data packets are typically exchanged via Ethernet connection. External machines and devices receiving packets that have been sent by the router are not part of the local subnet.

VPN: VPN stands for Virtual Private Network, a network that is constructed by using public wires to connect nodes. For example, there are a number of systems that enable creation of networks using the Internet as the medium for transporting data. These systems use encryption and other security mechanisms to ensure that only authorized users can access the network and that the data cannot be intercepted. For further description of a system providing authenticated access over a public network, see e.g., U.S. Pat. No. 6,324,648, Secure gateway having user identification and password authentication, the disclosure of which is hereby incorporated by reference. For further information on virtual private networks, see e.g., Kosiur, D., *Building and Managing Virtual Private Networks*, John Wiley & Sons, 1998, ISBN 0471295264 the disclosure of which is hereby incorporated by reference. VPN products are available from a variety of vendors. Representative vendors include Cisco Systems, Inc. of San Jose, Calif., Check Point Software of Redwood City, Calif., and Intel Corporation of Santa Clara, Calif.

SUMMARY OF THE INVENTION

The present invention comprises a system providing methods regulating access at a computing system or device as required for connection of the device to a network. The system of the present invention includes a connection manager, a rules engine and a security enforcement module. Upon receipt of a request for connection to a network, the connection manager determines access or security rules which are required to allow connection of the device to the network. The rules engine automatically generates a current access policy for regulating access at the computing device as required for connection to a network. The security enforcement module applies this current access policy for regulating access at the computing device.

The system provides methods for a computing system or device to apply a security policy required for connection to a network from a plurality of security policies available for governing connections. In response to receipt of a request from a device for connection to a particular network, a current policy to apply to said device for governing the connection to this particular network is determined from a plurality of available security policies. The current policy to apply to said device is generated by merging a plurality of security policies available for governing connections. After said current policy is applied to the device, the connection from the device to this particular network is allowed to proceed.

DETAILED DESCRIPTION OF A PREFERRED EMBODIMENT

The following description will focus on the presently preferred embodiment of the present invention, which is implemented in a desktop application operating in an Internet-connected environment running under a desktop operating system, such as the Microsoft® Windows operating system running on an IBM-compatible PC. The present invention, however, is not limited to any one particular application or any particular environment. Instead, those skilled in the art will find that the system and methods of the present invention may be advantageously embodied on a variety of different platforms, including Macintosh, Linux, BeOS, Solaris, UNIX, NextStep, FreeBSD, and the like. Therefore, the description of the exemplary embodiments that follows is for purposes of illustration and not limitation.

I. Computer-Based Implementation

A. Basic System Hardware (e.g., for Desktop and Server Computers)

Figure 1:
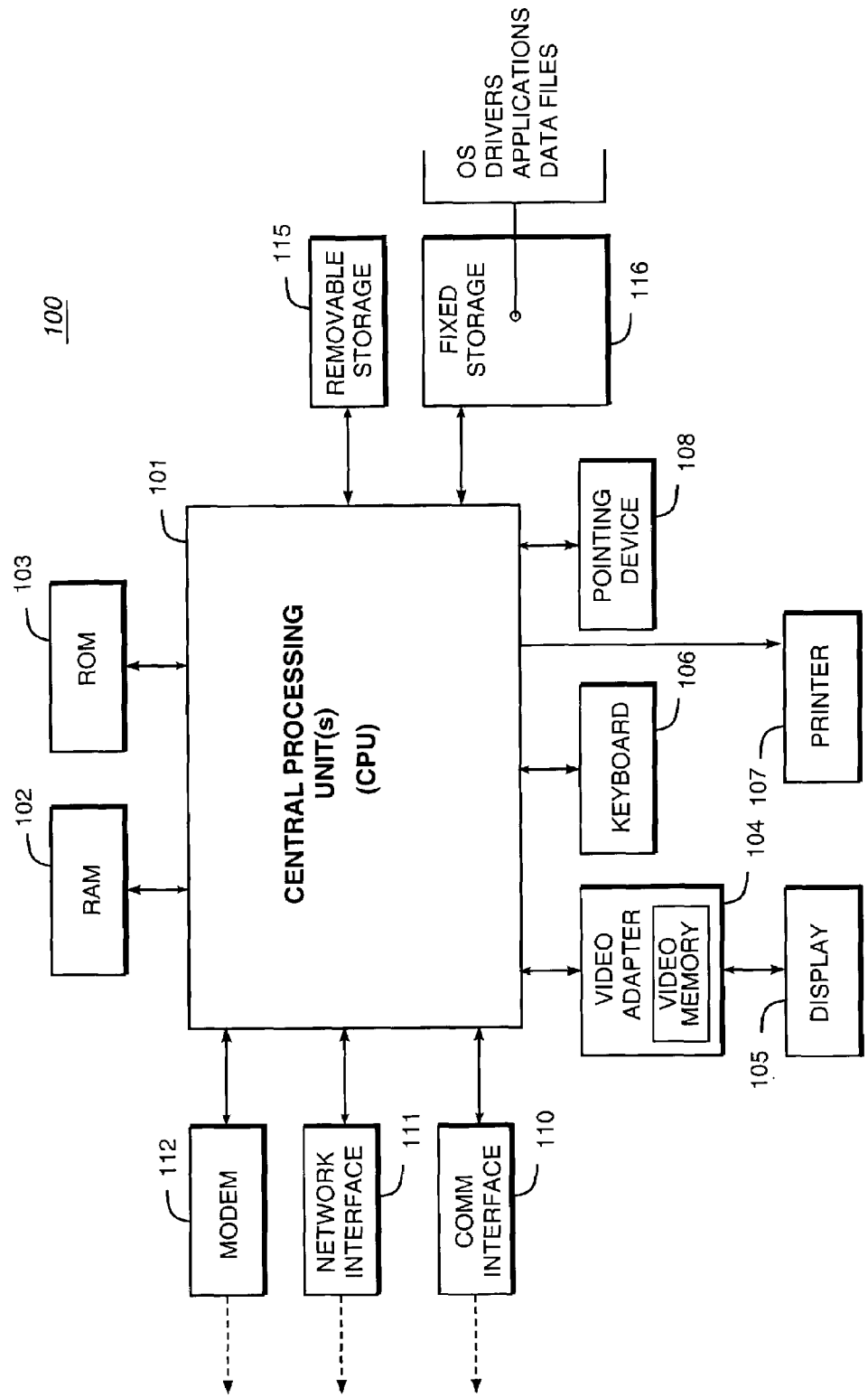
FIG. 1 is a block diagram of a computer system in which software-implemented processes of the present invention may be embodied.

The present invention may be implemented on a conventional or general-purpose computer system, such as an IBM-compatible personal computer (PC) or server computer. FIG. 1 is a very general block diagram of an IBM-compatible system 100. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real-time system clock is included with the system 100, in a conventional manner.

CPU 101 comprises a processor of the Intel Pentium® family of microprocessors. However, any other suitable processor may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Description of Pentium-class microprocessors and their instruction set, bus architecture, and control lines is available from Intel Corporation of Santa Clara, Calif. Random-access memory 102 serves as the working memory for the CPU 101. In a typical configuration, RAM of sixty-four megabytes or more is employed. More or less memory may be used without departing from the scope of the present invention. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display 105 and the system's bus, drives the display device 105. The video adapter 104, which includes video memory accessible to the CPU 101, provides circuitry that converts pixel data stored in the video memory to a raster signal suitable for use by a cathode ray tube (CRT) raster or liquid crystal display (LCD) monitor. A hard copy of the displayed information, or other information within the system 100, may be obtained from the printer 107, or other output device. Printer 107 may include, for instance, an HP LaserJet® printer (available from Hewlett-Packard of Palo Alto, Calif.), for creating hard copy images of output of the system.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem), examples of which are available from 3Com of Santa Clara, Calif. The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

IBM-compatible personal computers and server computers are available from a variety of vendors. Representative vendors include Dell Computers of Round Rock, Tex., Compaq Computers of Houston, Tex., and IBM of Armonk, N.Y. Other suitable computers include Apple-compatible computers (e.g., Macintosh), which are available from Apple Computer of Cupertino, Calif., and Sun Solaris workstations, which are available from Sun Microsystems of Mountain View, Calif.

B. Basic System Software

Figure 2:
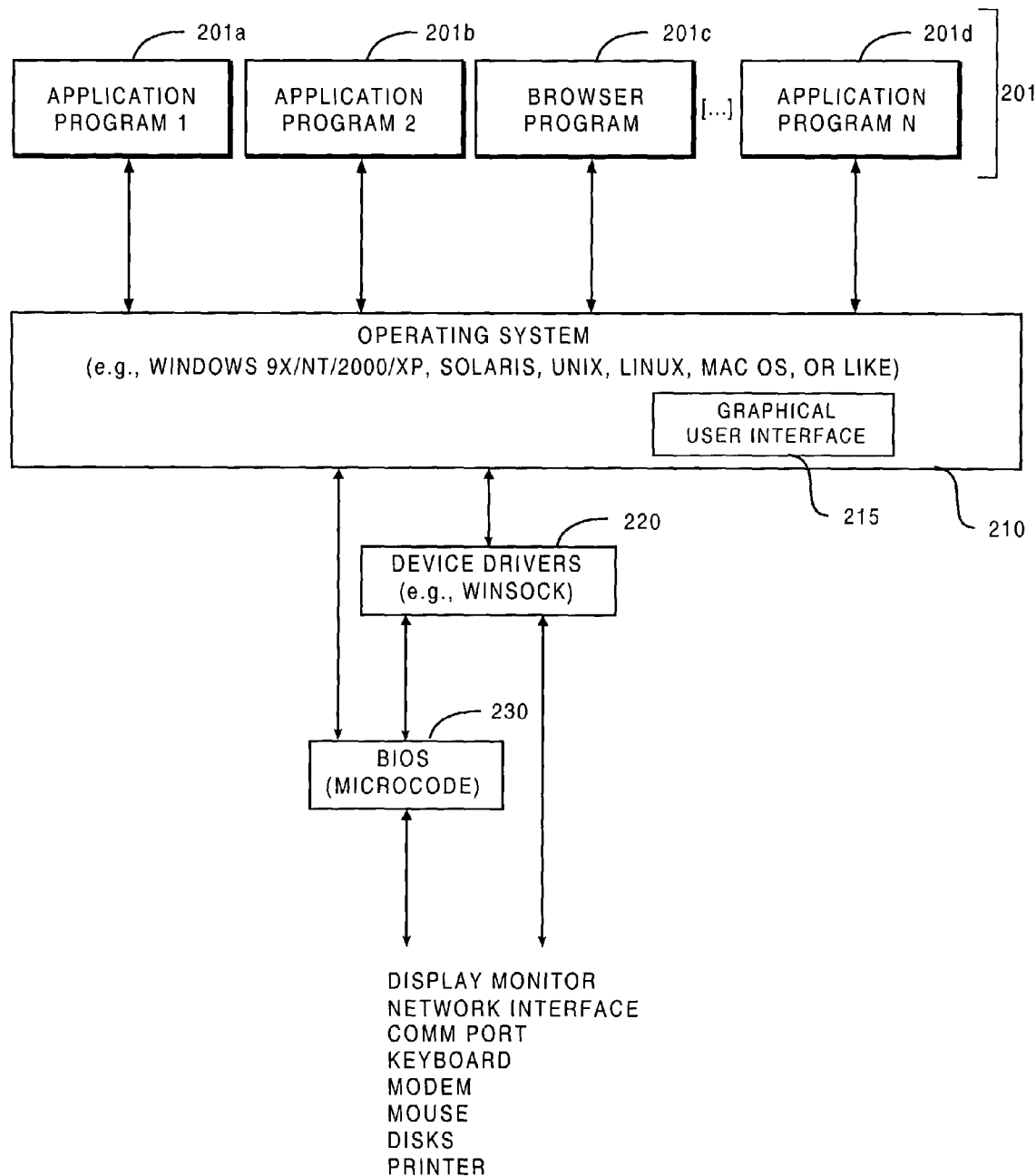
FIG. 2 is a block diagram of a software system for controlling the operation of the computer system.

Illustrated in FIG. 2, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201a, 201b, 201c, 201d) may be "loaded" (i.e., transferred from fixed storage 116 into memory 102) for execution by the system 100.

System 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft® Windows 9x, Microsoft® Windows NT, Microsoft® Windows 2000, or Microsoft® Windows XP, all available from Microsoft Corporation of Redmond, Wash. Alternatively, OS 210 can also be an alternative operating system, such as the previously mentioned operating systems.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., Web server) that communicates with one or more "clients" (e.g., personal computers). The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

II. System Facilitating Compliance With Multiple Security Policies

A. Overview

Today, computing devices are often connected to a number of different networks from time to time. As a user of a computing device connects or attempts to connect to different networks (e.g., LANs, WANs, or VPNs), different security policies may come into play. The system of the present invention provides methods enabling a user to have more than one security policy active at the same time on his or her computing device. The present invention also determines which security policies should be applied from time to time as a device connects to different networks and resources. In addition, when multiple security policies are active on a device, the system and methodology of the present invention determines the current security settings to be applied based upon merging or arbitrating these active security policies. In this manner, the system and method of the present invention enables a user to comply with a plurality of different security policies which may be required from time to time as the user connects to different networks and resources.

More particularly, certain events, such as opening a connection to a virtual private network (VPN) for example, may result in the activation of a security policy on a computing device. As security policies are activated (or de-activated) on the computing device from time to time, the currently preferred embodiment of the present invention provides for generating an arbitrated or "merged" policy to be applied on the device. As part of this process, set operations are automatically performed against specific component features (e.g., rules and settings) of active security policies to determine the rule or setting to be applied in the merged policy. The process of generating a merged policy facilitates compliance with security policies that may be required in order to establish and maintain connections to different networks.

In the currently preferred embodiment, a merged (or arbitrated) security policy is generated by generally adopting, for each particular security setting or rule, the most restrictive (i.e., most secure) setting of each of the active policies. However, in certain cases a user or administrator may configure the merged policy to include one or more settings that are not the most restrictive, as desired. For instance, an ordered list or other similar logic may be used by a user or administrator to determine which setting(s) to be applied when multiple policies with different settings are active. In the case of certain firewall rules and other restrictive settings, such as port and protocol restrictions, these restrictive settings are frequently unioned together to create an overall policy that enforces all restrictions. For example, if traffic through a particular port were blocked under any one of the active security policies, then traffic through that port would be blocked by the merged policy. On the other hand, certain other list settings may be intersected in the process of generating the merged policy. For instance, policy settings that are permissive, such as allowing the sharing of files amongst a local trusted zone (or group) of devices, are often intersected to narrow the permitted group. In this event, the local zone that is allowed by the merged policy may include only those computers that are trusted (i.e., included in the local zone and permitted to share information) under all applicable security policies.

In the case of particular security settings, such as local zone definition, certain exceptions may be made to the general policy of applying the most restrictive setting. For example, administrators may configure a corporate security policy that permits users to include home networks or other local networks or resources in the local zone (i.e., as trusted). A corporate security policy may be configured to allow a user to continue trusting computers, networks, and resources included in his or her local zone or, alternatively, may prevent the user from trusting any networks or computers other than those specified in the corporate security policy.

Similarly, it may also be desirable for a particular security policy (e.g., a corporate security policy) to defer to other policies (e.g., an individual security policy) in certain other aspects of security policy configuration and enforcement. In these cases a given security policy may effectively delegate authority (or give precedence) to certain settings of other security policies that may be in effect on a device. For each setting or policy element of a particular security policy, a user or administrator may specify whether or not such setting or element may be overridden by another security policy. In the currently preferred embodiment a tag may be included in a security policy to indicate that a particular policy setting or element may be overridden by another valid policy. The specific policy or policies to be given precedence may also be specified, as desired. For example, a setting of a particular security rule may specify to ask the user (e.g., issue an event alert to the user interface) as to whether or not to permit a particular application to access the Internet. A security policy may be configured to defer to the user in this manner, but also provide that in the event the user is not available (e.g., does not respond to the alert), Internet access by the application is to be blocked.

In the case of many individual settings, such as high, medium, and low security levels, determination of the setting to be applied by the merged policy is made based upon an ordered list pre-selected by a user or administrator for such individual setting. The ordered list may, for instance, indicate that the "high" security level should be applied if any of the policies has this setting. In the currently preferred embodiment, the most restrictive setting called for by any of the active security policies is typically applied. For example, an application permission rule may specify whether a particular application is permitted to access the local zone, access the Internet, or act as a server for either local zone or Internet communications. In the currently preferred embodiment, there are four possible settings for application permissions with values that can be ordered as follows: allow connection to the local zone, allow connection to the Internet, allow application to act as a server to the local zone, and allow application to act as server to the Internet. The values "allow", "ask", and "disallow" may be associated with each of these four settings. The value "allow" permits access and "disallow" denies access. The value "ask" causes an event notification to be issued to the user interface to obtain user input about whether or not to permit access (or may apply a default setting in the event the user does not respond). For purposes of merging the settings of active security policies, these values are ordered from low to high in the currently preferred embodiment as "allow", "ask", and "disallow". In this case if one policy had the value "ask" and a second policy had the value "disallow", the merged policy would utilize the value "disallow" based upon the above pre-selected ordering of these values.

Various other logic may also be used to reconcile settings or rules of multiple security policies. For example, one policy (policy A) may provide that access to a particular resource is prohibited, while another policy (policy B) permits access to this resource. In this situation, a rule may applied that reconciles these conflicting rules based upon arbitrary logic such as the following sample pseudocode:

If policy A has a setting prohibiting access to a resource; and

If policy B has a setting permitting access to a resource; then

If certain criteria are satisfied, policy B takes precedence and access is permitted;

Otherwise, policy A takes precedence and access is prohibited.

As described above, particular security settings or rules to be applied may be determined in a number of different ways, including unioning restrictive lists, intersecting permissive lists, based upon an ordered list, based upon other logic selected by a user or administrator, or any number of other approaches. Different approaches may also be used for different policies or settings, if desired. Those skilled in the art will appreciate that there are many other alternative methods for reconciliation of security settings of multiple policies in order to generate a merged security policy (or set of security settings).

In any event, after a merged (or arbitrated) security policy has been generated as a result of the above security arbitration process, the merged policy may then be applied and enforced by an end point security module to regulate access to and from the user device. In the event one or more of the security policies is subsequently de-activated on the device (e.g., upon disconnection from a network), or a new policy is activated (e.g., upon connection to a new network) the same security arbitration process may be repeated. The events triggering modifications to security settings will now be described in more detail.

B. Events Triggering Modifications to Security Settings

The arbitrated security policy, which is generated to regulate access to and from a particular device, is typically based upon the security policies that are active (i.e., loaded in memory and activated) on the device from time to time. For example, a user accessing his or her employer's corporate servers through a VPN may be subject to his or her own individual security policy or settings as well as an employer's corporate security policy which is required in order to remotely access the corporation's servers. As described below, access to the corporation's servers through the VPN may cause activation of a corporate security policy. This corporate security policy is then arbitrated with individual security settings to generate a merged set of security settings to be applied during the VPN session. At the conclusion of the user's VPN session, the corporate policy may be deactivated, and in such event the security settings may revert back to the user's individual settings.

A number of different events (trigger events) may occur which result in the update or modification of the applicable security settings in force from time to time on a computing device. These trigger events may cause activation of one or more security policies on a client device (e.g., a corporate security policy) and revision of security settings on such device. For example, when a user opens a VPN connection to a corporate server, a previously installed corporate security policy may be activated on his or her device. This same event may also cause the security settings that are in effect on the device to be examined and modified.

There are several different types or classes of trigger events that may cause activation or deactivation of a security policy on a device. The currently preferred embodiment includes the following classes of trigger events: "location", "connected socket", "latch", "generic API", "time-based", "negotiation for layer 3 access", and "miscellaneous" (which may include other arbitrary events that may be defined if desired). Each of these classes of events will now be described.

The "location", "connected socket" and "latch" classes of trigger events are based upon the opening or closing of various types of connections on the client device. The "location" class of trigger events includes changes in the type of network connection that a user has open, typically based upon automatic detection of gateway IP address, MAC address, wireless access point network identifier, dialup-connection, or other such network information. An example of a "connected socket" class event is the creation of a socket that connects to a particular IP address (or series of addresses) and a specific port. The termination of a socket connection may also constitute a trigger event. "Latch" events are similar to connected socket events, except that latch events involve a degree of persistence as they relate to repetitive, short-lived TCP connections. Accordingly, security policies are not activated and deactivated as each single TCP connection is opened and closed. Rather, a security policy is generally activated as these types of connections are initiated and maintained until all connections have been closed for a certain period of time.

Other classes of events include "generic API", "time-based", "negotiation for layer 3 access", and "miscellaneous" events. An example of a "generic API" class event is a call from a VPN client (e.g., Cisco Systems VPN client software) to the TrueVector engine which may trigger activation or deactivation of a security policy. An example of a "time-based" event that may trigger security policy activation is providing for different security policies based upon the time of day. For instance, a corporation may activate a stronger security policy after normal business hours. The stronger security policy may then be deactivated after a certain period of time (e.g., the next morning at the start of normal business hours). Both the activation and deactivation of this stronger security policy may trigger changes to security settings on a device connected to the corporate network. "Negotiation for layer 3 access" describes the process for establishing a network transport protocol (commonly called Layer 3 protocol, such as TCP/IP or UDP/IP or other "IP family" protocols) on top of an existing link layer protocol (commonly called Layer 2 protocol, such as Ethernet, SLIP or PPP). For example, successful completion of negotiation (or authentication) of IP transport layer on a PPP link may constitute a trigger event causing activation of a security policy. As another example, successful completion of negotiation (or authentication) of an IP transport layer on an 802.1x wireless link may constitute a trigger event causing activation of a security policy. In addition to the foregoing classes of events and examples, various other arbitrary or "miscellaneous" events can be defined as triggering activation of deactivation of security policies on a device, as desired. As described above, a number of different events may trigger or invoke the methods of the present invention for activation or deactivation of security policies on a device.

Certain trigger events may also cause a connection to be initiated to a machine which is referred to as an "integrity server" or a "policy server." An integrity server or policy server ensures that all users accessing a particular system or network comply with specified security policies. For example, if a trigger event occurs and a copy of a corporate security policy is not available on a client device, the device may initiate a connection to an integrity server. In such event, corporate security policies pre-defined and assigned to the user are typically downloaded to his or her device from the integrity server. In situations where a corporate security policy is available on the device, the integrity server compares the local copy on the device (i.e., a copy the user has previously installed or downloaded) to the then-current version to determine if the user's copy should be updated. The copy of the corporate security policy on the client device is refreshed if required. If a particular client device does not have a required client security module or policy installed, the integrity server can cause access to the corporate network to be denied until such device has installed and activated the required module or policy.

Whether or not a connection to an integrity server is initiated by a trigger event, the activation of a security policy on the client device may also invoke the method of the present invention for generating a merged security policy to apply on the device. Typically, if other security policies are also active on the client device when a new policy is activated, settings of all currently active security policies are arbitrated and a merged policy is generated as a result. For example, a corporate security policy may be arbitrated with the user's individual security settings as previously described. Firewall rules and other security settings are generally reset based upon the merged security policy that is generated. These rules and settings may then be enforced by the client security module (i.e., an end point security module) on the client device.

After the user terminates his or her VPN session and is no longer subject to the corporate policy, the applicable security settings may again be reset. In the event the corporate policy is deactivated, the security settings may be refreshed based solely upon his or her personal settings. In this example, the termination of the VPN session is an operation that triggers resetting of the firewall rules and security settings. This involves two steps. The first step involves the resetting of the firewall rules based upon the merged policy or policies that remain active on the user's machine. The second step involves a sequential evaluation of each of the active security policies. For example, when a particular program attempts to access the Internet, each active policy is examined in turn to determine if access is permitted under the rules of all active policies. In other words, each active security policy is consulted in a sequential fashion. As an alternative to the above, a user or administrator may instead configure a corporate policy to remain active and in effect on the user's machine after the user disconnects from the corporate server. This configuration option may be utilized in order to provide the organization with a higher degree of endpoint security control.

C. Exemplary Implementation Securing a Virtual Private Network

Figure 3:
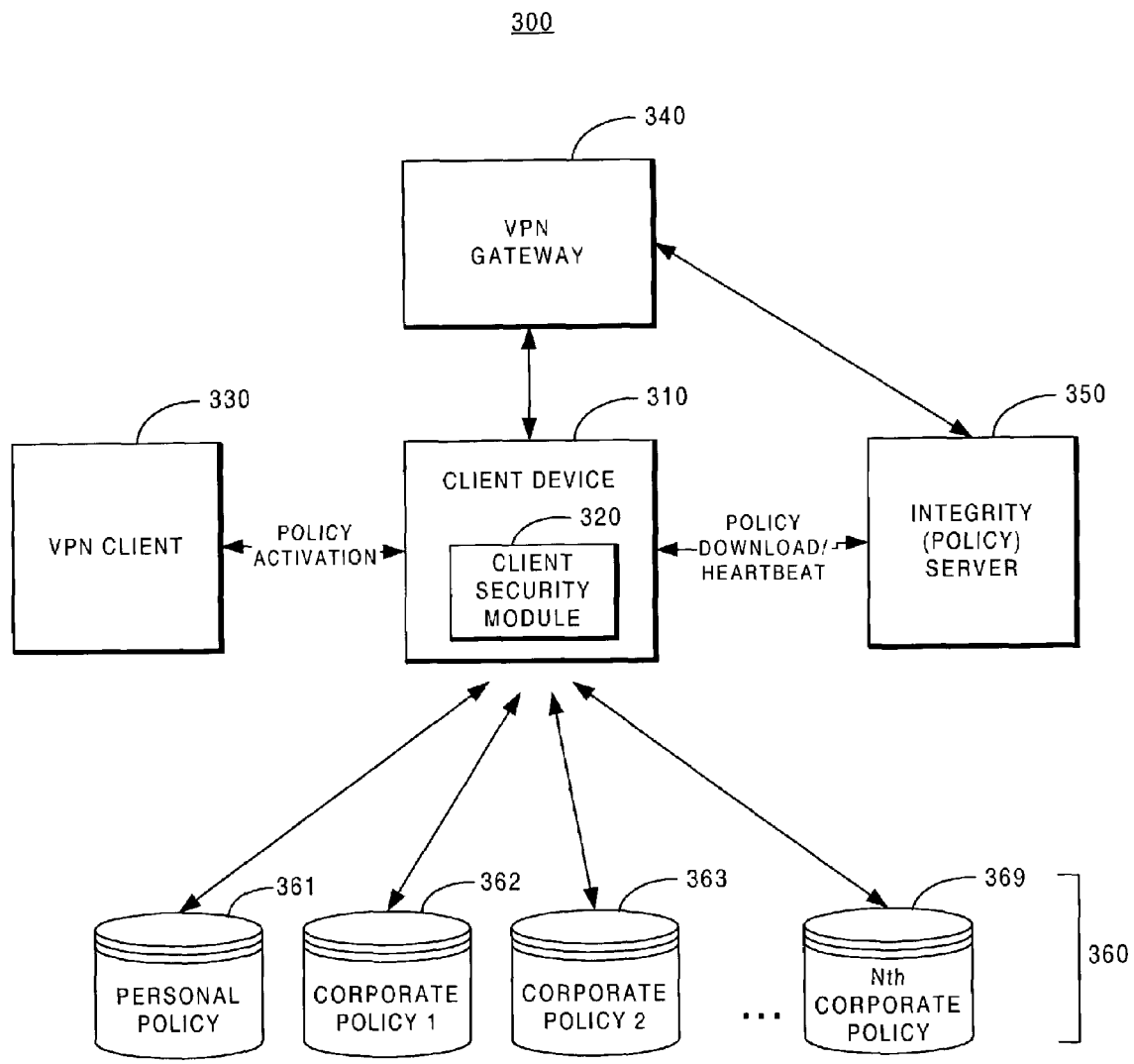
FIG. 3 is a block diagram of an exemplary environment in which the present invention may be utilized to provide security to a corporate environment accessed by remote users.

FIG. 3 is a block diagram of an exemplary environment 300 in which the present invention may be utilized to provide security to a corporate (or similar) environment accessed by remote users through a virtual private network (VPN). As shown, environment 300 includes a client device 310, a VPN client 330, a VPN gateway 340, and an integrity server 350. A client security module 320 is installed on the client device 310. Environment 300 also includes one or more repositories 360 for the client device 310, with each repository containing a security policy. As shown at FIG. 3, the repositories 360 include a repository 361 containing a personal security policy, and repositories 362, 363, 369 containing corporate security policies. For purposes of discussion of the operation of the present invention, the following description uses the example of a remote client device connecting to a corporate server through a virtual private network (VPN). The present invention, however, is not limited to any particular environment or device configuration. In particular, a VPN connection to a corporate network is not necessary to the invention, but is used to provide a framework for discussion. As previously described, users may connect to various other organizations, such as government entities and financial institutions, in addition to corporations. In addition, various different types of connections, including dial-up modems and various types of wireless connectivity, may be utilized to connect to different organizations. The present invention may be implemented in various environments in which a user of client device interacts with one or more host devices.

The client device 310 represents a personal computer (such as the previously described system 100), a personal digital assistant, or another type of computing device. The client device 310 may be a desktop computer or a laptop computer, notebook computer, or another type of mobile device. The client device 310 may connect to various networks from time to time at home, at work, and at other locations. The client security module 320 is typically installed on the client device 310 and supports the client-side operations of the present invention. The VPN client 330 may also be installed on client device 310 or on a separate machine. For example, a VPN software client (e.g., Cisco VPN client software) may be installed on the same machine as the client security module 320 (i.e., client device 310). The VPN client 330 may also be installed on a separate device (e.g., Cisco 3002 VPN hardware client), or on a firewall or router. In each of these situations, the VPN client 330 is a module that enables client device 310 to establish a connection to a virtual private network (VPN). For example, a user may utilize a VPN to connect the client device 310 to his or her employer's remove server over the Internet. In the currently preferred embodiment, the VPN client software comprises Cisco VPN Client for Windows, version 3.5.1 from Cisco Systems, Inc. of Santa Clara, Calif. The currently preferred embodiment also operates in conjunction with VPN 3000 Concentrator Series, which is VPN gateway software also from Cisco Systems. However the present invention may also be used in conjunction with VPN client and VPN gateway hardware and software products available from a number of other vendors including Check Point Software of Redwood City, Calif., and Intel Corporation of Santa Clara, Calif. In response to a user request to establish a connection to a remote network or server, the VPN client 330 communicates with the VPN gateway 340. The VPN client 330 may also initiate policy activation from integrity server 350. Alternatively, client security module 320 may initiate policy activation from integrity server 350 as hereinafter described. The VPN gateway 340 is a module that listens for communications from client devices, such as the VPN client 330, and performs the tasks necessary for establishment of a VPN session for connection of the client device 310.

The remaining components of environment 300 are the integrity server 350 and the repositories 360. The integrity server 350 includes a repository (not shown) that stores security policies and related information for transmission to various client devices, such as the client device 310. The integrity server 350 typically stores multiple security policies applicable to a number of different individuals or groups. In response to an initial policy activation message or a subsequent heartbeat message from the client security module 320, the integrity server 350 evaluates whether or not the client device 310 has a correct, up-to-date version of the applicable corporate security policy. As shown at FIG. 3, the repositories 360 represent local copies of several personal and corporate (or organizational) security policies resident on the client device 310. These repositories 360 are accessed and used by the client security module 320. In the event that the client device 310 does not have a local copy of the most current corporate security policy required for this VPN session, a download of the current corporate policy may be initiated from the integrity server 350 to the client device. The integrity server 350 also serves in a security enforcement role. In the event a client device does not have the correct policy loaded or the integrity server 350 detects some other problem, it may instruct the VPN gateway 340 to deny access to a client device. The components of client security module 320 and their interaction with the integrity server 350 will now be described in greater detail.

D. Operations of Integrity Server and Client Security Module

Figure 4:
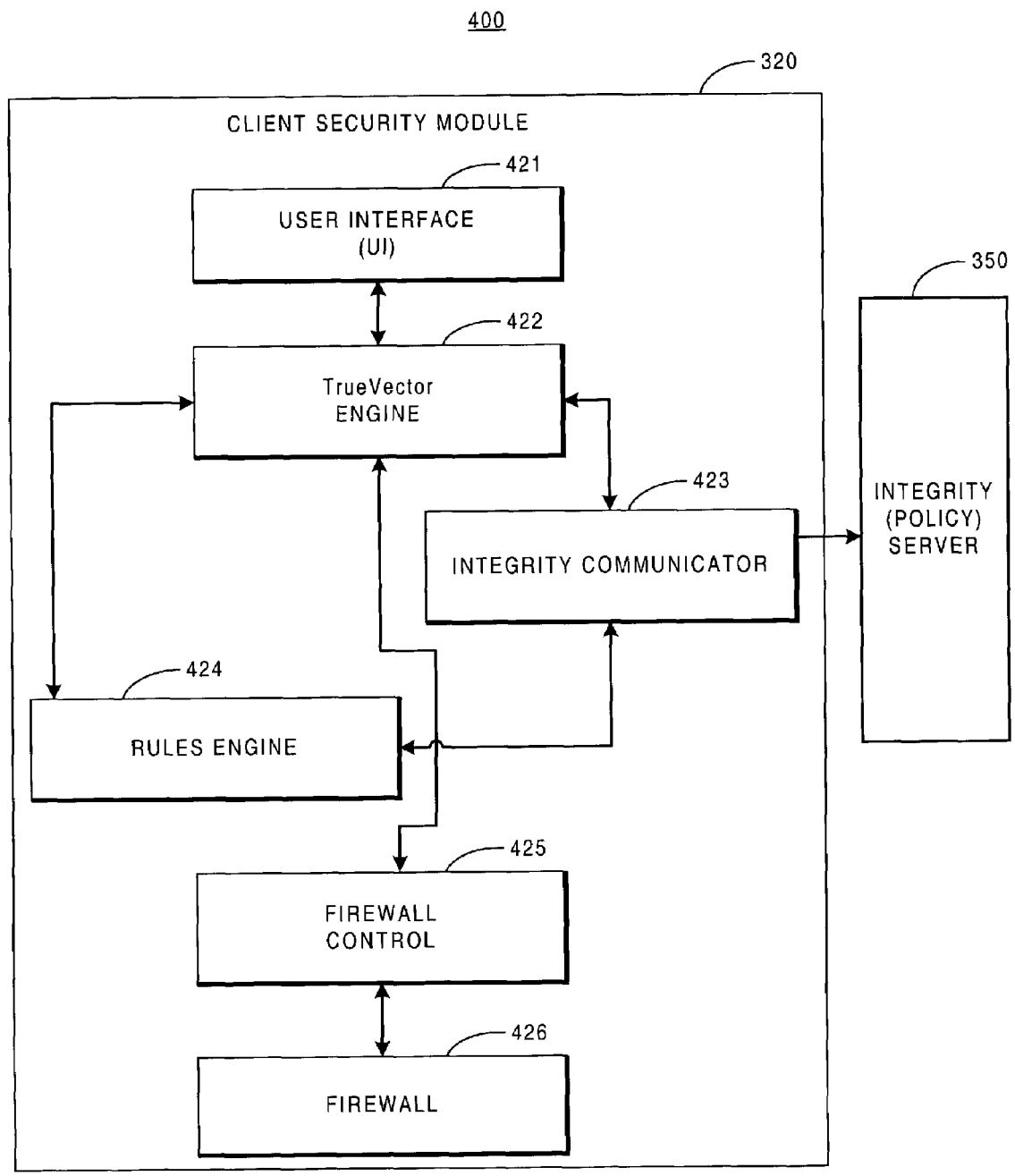
FIG. 4 is a block diagram illustrating the server-side components of the integrity server and the client-side components of the client security module of the present invention.

FIG. 4 is a block diagram of an environment 400 including the client security module 320 on a client device which is connected to the integrity server 350. The client security module 320 on the client device is typically connected to the integrity server 350 through a network, such as the Internet. As shown, the client security module 320 includes a user interface (UI) 421, a TrueVector® engine 422, an integrity communicator 423, a rules engine 424, a firewall control 425, and a firewall 426. Each of the components of the client security module 320 and their interaction with the integrity server 350 will now be described.

The firewall 426 handles incoming packets and detects the source address (i.e., the address a packet is coming from) as well as the destination address. Based upon source and destination addresses, the firewall 426 may apply packet-based restrictions to block packets sent to (or from) particular addresses. Firewall systems are well documented in the patent and trade literature; see e.g., U.S. Pat. No. 5,826,014, entitled Firewall system for protecting network elements connected to a public network, the disclosure of which is hereby incorporated by reference. In the currently preferred embodiment, the firewall 426 is implemented as a driver on the client device. For further description of the implementation of a firewall on a client device, see e.g., commonly-owned U.S. Pat. No. 5,987,611, entitled System and methodology for managing Internet access on a per application basis for client computers connected to the Internet, the disclosure of which is hereby incorporated by reference.

Security rules and policy arbitration are handled by the TrueVector engine 422 and the rules engine 424. The TrueVector engine 422 is responsible for handling higher-level security rules. For example, the TrueVector engine 422 may apply a rule that allows a connection from a particular application on a particular port. The rules engine 424, when invoked, arbitrates the security policy settings active on the client device as described in more detail below. This may involve determining whether or not particular events (e.g., connection events) are permitted by each of the rules of active security policies as well as resetting security policies and rules in response to certain events.

The user interface (UI) 421 and the integrity communicator 423 serve as communication interfaces for the client security module 320. The user interface 421 provides feedback to the user of the device on which the client security module 320 is installed. In an alternative embodiment, the client security module 320 operates in the background on a client device and does not include a user interface. The integrity communicator 423 listens for event notifications from other components of the client security module 320. From time to time, the integrity communicator 423 receives notifications of events, such as notification of a connection event sent by the firewall 426. The integrity communicator 423 may open a connection to the integrity server 350 in response to certain event notifications received as hereinafter described. In response to an event notification received (e.g., an event notification from the firewall 426), the integrity communicator 423 may also invoke the rules engine 424 to handle such event.

When invoked, the rules engine 424 evaluates the security policy settings of the TrueVector engine 422 to determine whether or not the event (e.g., connection event) is permitted by each of the rules of active security policies. This determination may involve a sequential operation in evaluating higher-level rules of each active security policy for purposes of determining whether or not to permit this connection. This is typically an event-drive process in which active security policies are examined as each access request is received. Certain events (e.g., activation of a new security policy upon connection to a VPN) may also cause the rules engine 424 to update the appropriate packet-based restrictions to be applied by the firewall 426. The firewall control 425 receives properties (rules) from the rules engine 424 and applies these properties to the firewall 426. The firewall control 425 may receive one property at a time or may request the rules engine 424 to provide a merged (i.e., arbitrated) set of properties (rules). In the currently preferred embodiment, the firewall control 425 requests a merged version of all applicable firewall rules from the rules engine 424 whenever a security policy is activated or made inactive on a device (e.g., activated on start-up or made inactive on disconnection as previously described).

E. Process for Modification of Security Settings in Response to Events

Figure 5A:
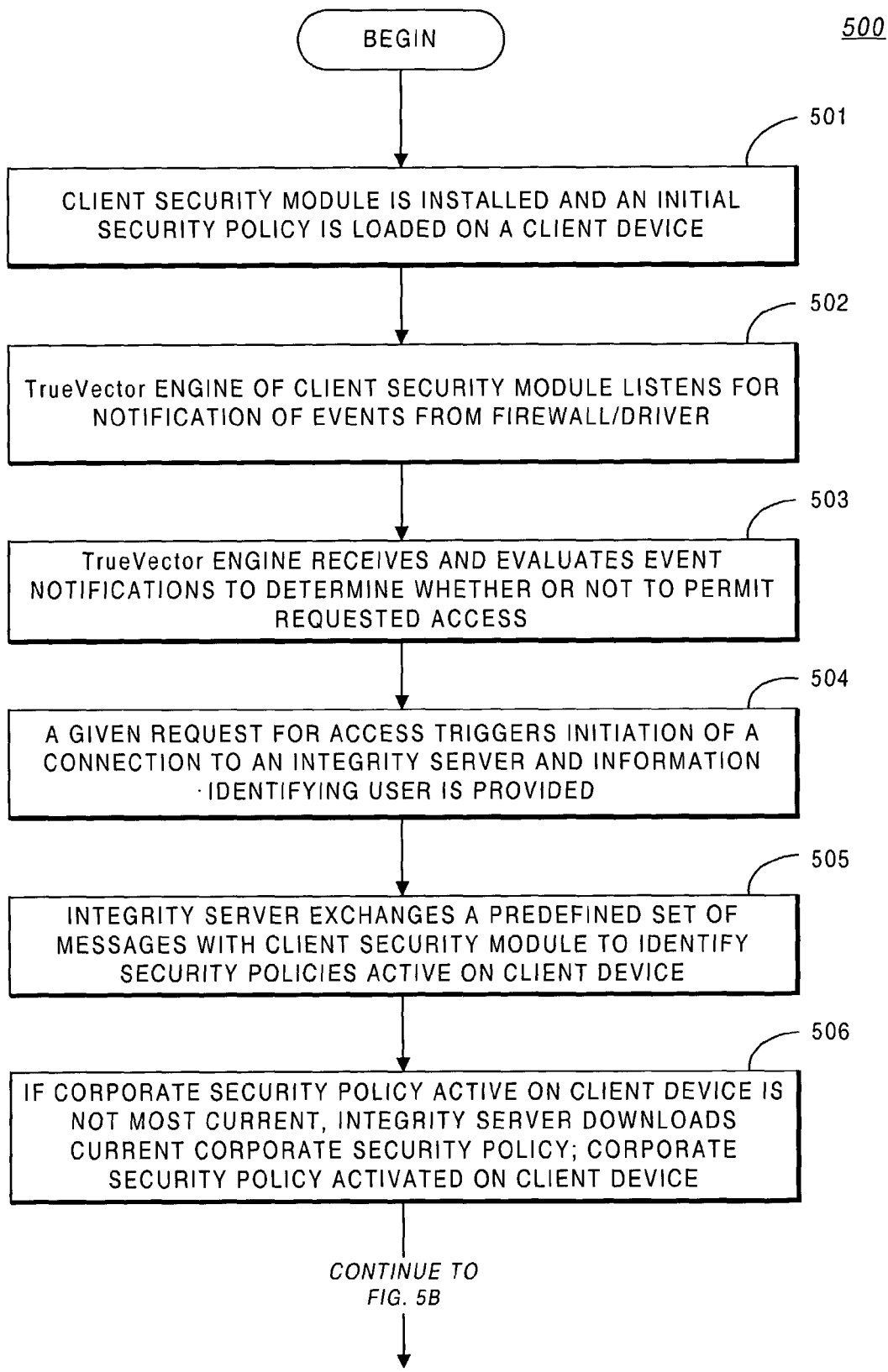
FIGS. 5A-B comprise a single flow chart illustrating detailed method steps of the operations of the present invention in automatically modifying security settings on a client device as it connects to systems or networks.
Figure 5B:
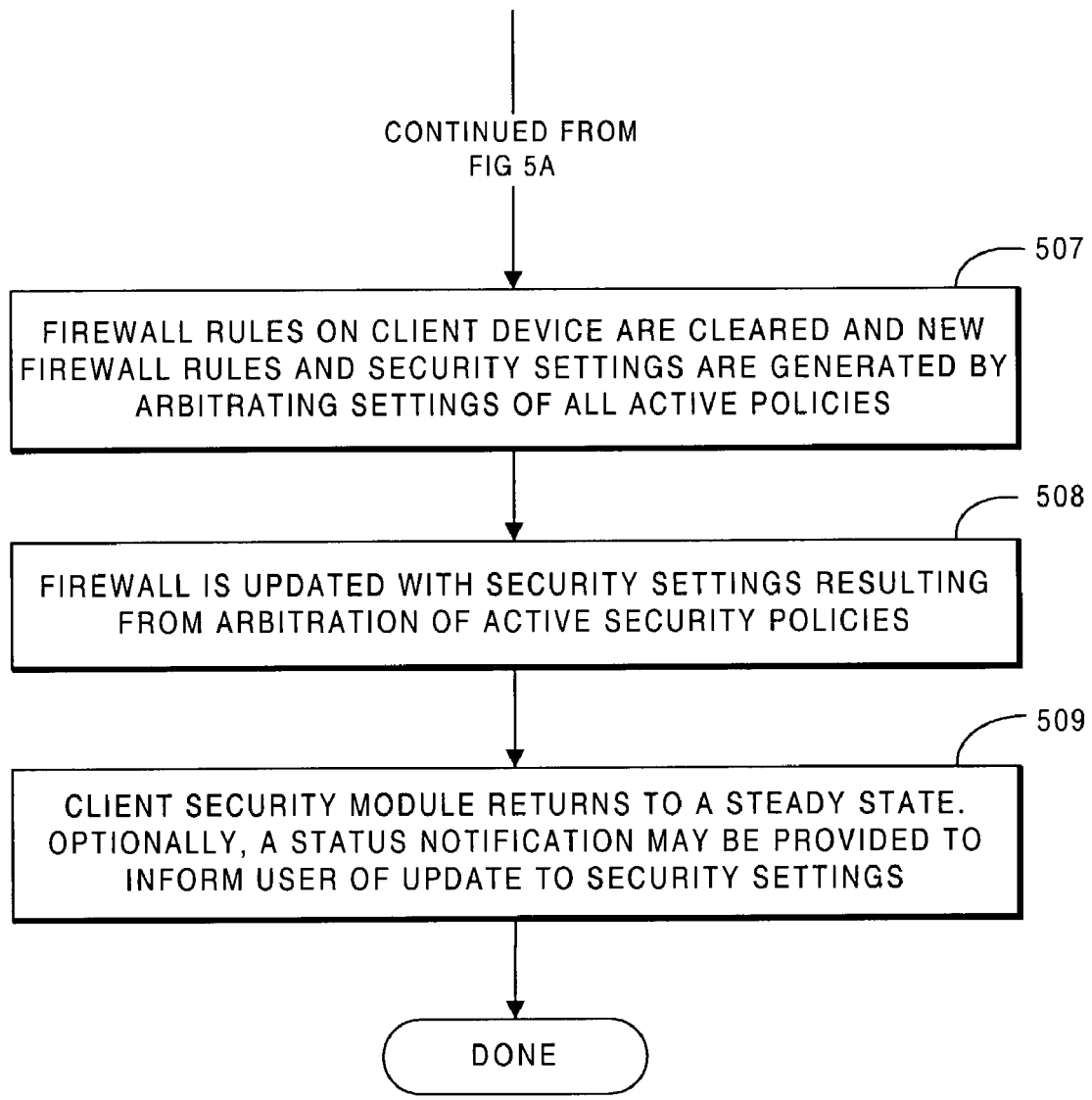

FIGS. 5A-B comprise a single flow chart illustrating detailed method steps of the operations of the present invention in automatically modifying security settings on a client device as it connects to various systems or networks from time to time. The following discussion uses as an example the connection of a client device to a corporate server through a VPN. However, those skilled in the art will appreciate that this is only one example of the many different types of situations in which the present invention may be advantageously utilized.

Initially, at step 501 the client security module installed on a client computer or device loads an initial security policy. This initial security policy may be a personal or a corporate security policy. By default, security policy settings are generally set initially to the lowest level of security. In the currently preferred embodiment, a user may adjust these initial settings to implement his or her own personal security policy settings to provide an appropriate level of security on the client device. In an alternative embodiment, the initial security settings of the client security module are not user-configurable. In this case, the initial security settings remain in effect until the creation of a merged (i.e., arbitrated) security policy, which may occur when the client device on which the client security module is installed connects to a system or network utilizing an integrity server.

After the client security module is installed and the initial security policy is loaded, at step 502 the client security module listens for notification of events from the firewall (e.g., attempts by the client device to connect to a server on the Internet or receipt of incoming packets from other machines). The firewall, which is implemented as a driver in the currently preferred embodiment, directly handles certain events using the initial security settings. Other events may trigger the posting of event notifications to the rules engine and/or TrueVector engine of the client security module. For example, an incoming packet that is not blocked by the firewall may trigger posting of an event notification. Similarly, outgoing traffic, such as an application that starts up and attempts to connect to the Internet, may also cause posting of an event notification.

As event notifications are received, at step 503 the client security module evaluates these events and determines whether or not to permit the requested access. As part of this process, the client security module loops through a series of policies (i.e., sets of rules of one or more security policies) to determine whether or not they are applicable to this particular event. In the currently preferred embodiment, one set of rules includes an application permission rule which examines applications requesting access and determines whether or not particular applications are allowed access to perform particular tasks. For example, an application permission rule may specify whether a particular application is permitted to access the local zone (a defined group of trusted computers), access the Internet, or act as server for either local zone or Internet communications. In the currently preferred embodiment, a number of other rules are also evaluated as part of this process as hereinafter described in greater detail. Of particular interest with respect to the present invention are integrity connection rules that may apply to particular connection requests, such as a request for a VPN connection. A request to establish a VPN session in order to access a given corporate server may, for instance, cause the client security module to trigger a connection to the corporation's integrity server for purposes of evaluating whether appropriate security policies are active and in effect at the client device. Alternatively, as previously described, the VPN client or VPN gateway modules may trigger notification to an associated integrity server. For example, a VPN client may call the integrity server directly to alert the integrity server of a connection request.

If a given request for access triggers a connection to the integrity server, at step 504, a Secure Sockets Layer (SSL) connection to the integrity server is initiated. The client security module will also attempt to locate the security policy associated with the integrity connection rule triggering the connection to the integrity server. The client security module first tries to locate the applicable security policy locally and, if found, to load and activate this security policy. If the policy is not found locally, the client security module establishes a connection to the integrity server and transmits information about the user of the client device. This information may include domain name, user name, user password, or other desired information uniquely identifying a particular user. This information is provided so that the integrity server may determine the corporate security policy that is applicable to this particular user.

The integrity server receives a login communication including information about the identity of a particular user. In response, at step 505 the integrity server exchanges a predefined series of messages with the client security module. The client security module provides information identifying the version of the corporate security policy stored on the client device (i.e., the security policy associated with the corporate server(s) being accessed by this user). In the currently preferred embodiment, a cryptographic hash, such as a message digest (e.g., MD5) is preferably employed to provide this information in encrypted form to avoid tampering and to uniquely identify the corporate security policy. For a discussion of cryptographic hashes, including MD5, see e.g., Schneier, B., *Applied Cryptography*, Second Edition, John Wiley & Sons, Inc., 1996, the disclosure of which is hereby incorporated by reference. The client security module also commences providing, at pre-selected intervals, a "heartbeat" message to the integrity server confirming that the client security module is operating on the client device and is enforcing required corporate security policies. Every few seconds the integrity server sends out a communication to connected client device(s) requesting a "heartbeat" response from the client security module on such client device(s) within a certain time period. The response time requested is randomized so that each client device responds at a slightly different time to avoid packet collision that might occur if multiple client devices were to respond at once. If a client device does not respond within the specified time frame allowed or does not answer at all, this failure to respond could result from the deactivation of the client security module or perhaps because there is a connection problem. In the currently preferred embodiment, the heartbeat response sent by the client security module contains the following information:

version
status
signature
sessionID
Firewall event control
Program event count
Mailsafe event count
Program observation event count
policy MD5
policy version The integrity server evaluates responses as compliant or non-compliant and may take certain actions when a client device is non-compliant, including denying access to non-compliant client devices. Further description of the receipt by a server-side component of periodic messages from client device(s) for purposes of confirming ongoing compliance with security requirements is provided in commonly-owned application Ser. No. 09/944,057, filed Aug. 30, 2001, entitled "System Providing Internet Access Management with Router-based Policy Enforcement", the disclosure of which is hereby incorporated by reference in its entirety, including any appendices or attachments thereof, for all purposes.

At step 506, the integrity server evaluates the security policy information received from the client (e.g., by comparing the policy information received to the current corporate security policy). If the client device is not using the most current policy, the integrity server downloads the current corporate security policy to the client device. The client security module may then load this corporate policy as a local, active security policy on the client device. In the currently preferred embodiment, the policy is loaded into memory and is marked as an active policy. A copy of the policy is also stored locally in a database.

Activation of a new security policy on the client device triggers an update of the security settings. At step 507, the prior firewall rules on the client device are cleared and new firewall and security settings are generated based upon the new security policy. At this point the security settings are refreshed by going through all of the security policies and generating a result (or merged) set of security settings from arbitration of active security policies. Multiple security settings are arbitrated by adopting, in the currently preferred embodiment, the most secure security setting of each of the active security policies, as hereinafter described in more detail. If desired, security policies may also be arbitrated (or merged) by adoption of the security settings of the corporate policy for either all settings or for particular settings. Those skilled in the art will appreciate that various implementation-specific choices may be made regarding how to reconcile two or more security policies to provide appropriate end point security to both organizations and individual users. For example, in the currently preferred embodiment, administrators have the option of configuring a corporate security policy that permits users to include home networks or other local networks or resources in the local zone (i.e., as trusted). As previously described, a corporate security policy may allow a user to continue trusting computers, networks, and resources included in his or her local zone or, alternatively, may require application of the local zone definition specified in the corporate security policy.

At step 508, the firewall is updated with the new security settings that result from arbitration of active security policies. The firewall control updates the firewall settings based upon the new arbitrated security policy determined as a result of step 507 above. These new settings are also stored locally on the client device. In the currently preferred embodiment, the new settings are stored locally in a database, replacing the previously stored security settings.

Optionally, at step 509, a status notification may be provided to the user interface to inform the user of an update to the security settings. Heartbeat messages are also provided periodically to the integrity server as previously described. At this point, the firewall rules have typically been refreshed and activated on the client device. The client device returns to a steady state and the client security module listens for event notifications. A subsequent event may cause the above process of modifying the security settings on the client device to be repeated. For example, disconnection of the client device from a VPN session may cause an event notification on the client device. Receipt of an event notification by the rules engine or TrueVector engine may cause the corporate policy to be de-activated on the client device and trigger modification of the security settings on the client device. Some or all of steps 503 to 509 may be repeated depending upon the event notification received. For example, if only the user's personal security policy and one corporate policy were active during the VPN session, the settings would typically revert back to the user's personal settings after the corporate policy was no longer active. However, as previously described, a corporate policy may be configured to survive after the user disconnects from the corporate servers.

It should also be noted that the method of the present invention for merging multiple security policies does not require a connection to an integrity server. As previously described, certain trigger events may cause activation or deactivation of security policies already loaded on a client device. In such circumstances, the activation of a new security policy (e.g., upon opening of a new connection) on the device typically invokes the method of the present invention for generating a current security policy based upon merging of security policies active on the device as described above in steps 507 through 509. The methodology of the present invention for reconciling (or merging) multiple securities policies will now be described in more detail.

F. Merging of Security Policies

When a trigger event occurs that causes a corporate policy to be downloaded or activated on a client device, existing firewall rules and security settings are typically cleared and a new security policy is generated by arbitrating the rules of each active policy. There are two general types of security settings that are considered in generating a merged security policy: individual settings that set or reset one value, and list settings that create lists of values. In the case of individual settings, the most restrictive setting called for by any of the active security policies is typically applied. Determination of the most restrictive setting is made based upon an ordered list applicable to each individual setting. This same approach is also used for Boolean values (e.g., "yes" or "no"), because sometimes "yes" is the most restrictive setting, and other times "no" is more restrictive. For most security settings that create lists of values, the general approach used is to concatenate or intersect the contents of all lists.

This process of merging multiple active policies is perhaps best illustrated by example. The following discussion contains several specific examples of security settings that are arbitrated in the currently preferred embodiment of the present invention. However, those skilled in the art will appreciate that the methodology of the present invention may also be advantageously employed in conjunction with many other settings that are not described in the following examples.

A first example involves a "restricted zone" setting. In the currently preferred embodiment, a user or administrator may define a "restricted zone" to include a list of particular sites or servers that the client device is not permitted to access. When multiple security policies are active, the restricted zone of the merged policy is created by adding together the restricted zone lists of all active policies. In other words, the merged policy is generating by concatenating all restricted zone values into single list.

Another setting that must typically be reconciled when multiple policies are merged is the "local zone" definition. A "local zone" is a group of trusted computers defined by a user or administrator that is typically subject to less restrictive security rules than other computers and devices (the group of all computers outside the local zone is sometimes referred to as the "Internet zone"). For example, several computers in a home network may be included in the local zone of a user's individual security policy. The local zone definition is one of the more difficult settings to reconcile. While most other policy settings (e.g., the restricted zone described above) involve subjecting machines or groups of machines to more restrictive policies, the local zone defines a group that is subject to fewer security restrictions. Also, the local zone settings of different security policies are likely to be in conflict as organizations and individuals often having different views about whom they are willing to trust. For example, suppose security policy A restricts access by all applications on a client device to the local zone and this policy prohibits all access to machines outside of this local zone. Assume policy A also defines the local zone as including subnet 192.168.254.xxx. If policy A is the only active policy, this local zone definition may be applied without any problems. However, if security policy B has a similar restriction (i.e., only permits application to access the local zone) and defines the local zone as including subnet 192.168.253.xxx, it may be difficult to reconcile the settings of the two policies. If both subnets were added to the local zone of the merged policy, then applications would be able to access both subnets, potentially moving information from one to the other in a manner that may be contrary to the expectations of a user or administrator. However, if the two local zone settings were intersected, the local zone would contain no members, which, in this example, would block all access to (and from) other machines.

As previously described, the currently preferred embodiment provides that local zone definition may be an exception to the general approach of adopting the most restrictive setting of any policy. Administrators may configure a corporate security policy that permits users to include home networks or other local networks or resources in the local zone (i.e., as trusted). This configuration allows a user to retain his or her existing local zone definition and continue trusting the computers, networks, and resources included in his or her local zone. Alternatively, the established corporate security rule may prevent the user from trusting any networks or computers other than those specified in the corporate security policy.

Another example of a security rule that may be arbitrated is an automatic lock rule which provides for a lock to be automatically applied to restrict access to and from a device in certain circumstances. The automatic lock rule includes three settings: "enabled," "trigger," and "mode." The "enabled"

setting allows the automatic lock to be enabled or disabled. The "trigger" setting may be configured by a user or administrator to trigger the automatic lock after either a certain number of minutes of inactivity, or when a screen saver is activated. The "mode" setting may be set to "high security" to block all Internet access to and from the device when the automatic lock is engaged or "pass lock" to permit certain applications to continue to access the Internet after the automatic lock is engaged. The "enabled" setting is arbitrated by selecting "enabled" if any one of the active policies is "enabled." Similarly, if the "mode" setting of any policy is "high security," the mode setting of the merged policy is "high security." The "trigger" setting of the merged policy is based upon the shortest time interval. The merged policy will either use the shortest screen saver interval, or the shortest minimum time period if this minimum time period is shorter than the screen saver interval.

The currently preferred embodiment of the client security module includes four security level settings. There are two settings in this category for local zones and two settings for Internet zones. The first setting is "security", with possible values: "low," "medium," and "high." This enables general security restrictions for the local zone and the Internet zone to be set to one of these three values. This setting is arbitrated by using the highest level selected in any policy. The second setting is "block server," with possible values "yes" and "no." If the value "yes" is specified in any policy, then the block server setting is enabled in the merged policy. Another similar example is the arbitration of the previously described application (program) permission settings. Recall that the values "allow," "ask," and "disallow" can be associated with each of these following four application permission settings: allow local, allow Internet, allow local server and allow Internet server. Arbitration of these settings from multiple policies involves ordering the above values from lowest to highest, with "allow" as the lowest and "disallow" as the highest value. The highest value of each setting in any of the active policies is used in the merged policy, consistent with the general approach of the present security policy arbitration methodology.

The following table briefly describes the general treatment of certain other security settings (i.e., those not already described above) when multiple security policies are combined to create a merged policy. Most of the following settings are security oriented and are generally arbitrated in the manner summarized below. However, some of the settings are "configuration" settings that modify the user's experience (such as whether and when to provide alerts to the user) that typically remain under user control.

| Category | Settings and Values | Settings of Merged Policy |
| --- | --- | --- |
| Program Protocol Permissions | The Type setting can have one of 3 values: all, allExcept, and only. These program protocol permission settings specify which ports a particular program may use for communication. For example, a policy may restrict Netscape Navigator to ports 80 and 443, and another policy may restrict this same program to ports 80, 443 and 8080. | If all policies have Type all for a program, the merged policy uses all. If some policies have all and the rest allExcept, the merged policy uses allExcept. Similarly, if some policies have all and the rest only, the merged policy uses only. A mixture of allExcept and only is more complex. Using set nomenclature, a new setting is created that has Type equal to only, and the set of ports is calculated by starting with the intersection of the ports in the only settings, and subtracting the union of the sets for the allExcept settings. |
| Firewall options | There is just one setting here: Block packet fragments. | This setting is combined from multiple policies by considering yes as the most restrictive and using yes for the merged policy if yes is used in any policy |
| Alert Suppression | Settings include a clear current value settings and other yes/no settings | Clear current values is ignored as current values are cleared in merging policies. The rest of the settings are yes/no settings that are set to no if any policy has no as the setting. |
| Mailsafe Settings | This group includes an Enable MailSafe setting that has possible values of yes and no (enable or not enable the Mailsafe feature). The Keep Settings setting has possible settings yes and no (to keep prior settings or to clear them). The Alert on Quarantine setting has possible values yes and no (to notify the user of quarantine or not). The last setting is a list setting for all the extensions that should be renamed (e.g., .vbs attachments to mail) | The Enable Mailsafe setting is combined by setting merged value to yes (i.e., enabling Mailsafe) if any policy includes the yes as its value. The Keep Settings value is ignored because activating a new policy (e.g., corporate policy) results in clearing and then reloading all policies. The Alert on Quarantine setting is combined by setting merged value to yes if any policy has yes as the value. The list setting is merged by unioning all extensions across the policies. Differing descriptions of |

| Category | Settings and Values | Settings of Merged Policy |
|---|---|---|
| | | the same extension may be resolved by either concatenating the descriptions or, alternatively, using the first one encountered. |
| Custom Security Configuration | This category has both individual settings and list settings. Most of the individual settings are of the form AllowXXXIn or AllowXXXOut. The Initial Values setting normally allows for Disabled, Default, and Current as values. The list settings in the Custom Security group allow the ranges of ports to be specified for different protocols, both incoming and outgoing. | The individual setting are combined by using the no value applying if any policy's value is no. The Initial Values setting is resolved by using the Default value. The hardest choice for the Custom Security group is how to handle the list settings. Currently, these are resolved by consolidating the port ranges for each protocol from each policy into one group of ranges. |
| More Info Settings | The Show Alerts setting is a configuration setting. The More Info Hide IP setting has three values from low to high: no, obscure, and yes. | The Show Alerts configuration setting is governed by the user. The More Info Hide IP setting is merged by using the highest value in any policy (with no being lowest and yes being highest). |
| Miscellaneous Configuration Settings | On Top Show Toolbar Check For Update Auto Restart Disable Firewall AA Disable Program AA Disable Check For Update Disable Change Registration Transmit Dialogs Show Minimized | These are mostly configuration settings, and so are generally governed by the settings of individual (user) policy. |

G. Integrity Connection Events and Arbitration of Security Rules

The following discussion will describe in greater detail the operations of the currently preferred embodiment of the present invention in analyzing packets to and from a client device (e.g., communication events) and initiating a connection to an integrity server in response to certain events. The process of arbitrating (or merging) security settings of multiple security policies will also be described.

The client security module includes a firewall for analyzing packets and taking actions to examine or block certain packets. The following WSockHandleMsg function is a message handler of the client security module which is called when events are sent from a lower-level driver (i.e., the firewall):

```
 1:  VOID WSockHandleMsg(PVSMSG_STREAM pMsgStream)
 2:  {
 3:      ...
 4:
 5:      switch(pMsgStream->dwMsg & MCWSOCK_MASKMSG)
 6:      {
 7:          ...
 8:
 9:          case MCWSOCK_CONNECT_BEFORE:
10:              MEInfo.dwValue = pMsgStream->dwType;
11:
12:              if ((pProcess = WSockOpenProcess(pMsgStream)) &&
13:                  (pSite = OpenSite(NULL,
((PVSMSG_CONNECT)pMsgStream)->INetAddr.U_Add.dwIPAddr, NULL)))
14:              {
15:                  dwID = pProcess->dwID;
16:                  DWORD dwEventResult =
17:                      pProcess->TriggerEvent(MSGEVT_SITE_CONNECT,
pSite, (PVSMSG)pMsgStream, &MEInfo, sizeof (MEInfo));
18:                  if (MSGEVT_CONTINUE(dwEventResult))
19:                  {
20:                      if (dwEventResult & MSGEVT_RETURN_VPN)
21:                      {
22:                          OpenVPNConn(pMsgStream, pProcess, MEInfo.dwRuleId);
23:                      }
```

```
24:
25:                           ...
26:
27:                           pProcess->dwMsgResult = 0;
28:                       }
29:                       else
30:                           pMsgStream->dwResult = WSAENETDOWN;
31:                   }
32:               break;
33:
34:               ...
35:       }
36:
37:       ...
38: }
39:
```

The above WSockHandleMsg is called when events such as network communication messages are sent from the firewall. This function receives information about a message as input, such as the destination and source IP address of a particular packet. Of particular interest to the present invention, the switch statement commencing at line 9 above provides for initiation of a connection to an integrity server when a packet with a particular destination IP address is received. For instance, a client security module installed on a client device may be pre-configured with a particular server address (e.g., an IP address and port for a connection to a particular corporate server). When a request for a connection to this preselected server address is made, the above WSockHandleMsg function may cause another connection to be initiated to the integrity server associated with this corporate server.

The process of analyzing packets (events) and triggering a connection to an integrity server will now be described more specifically. The if statement at line 12 checks for errors and proceeds unless an error condition is detected. Commencing at lines 16-17 above, an event that is received is analyzed to determine whether it should trigger a connection to an integrity server. More particularly, the dwEventResult return value of the TriggerEvent is processed and at line 18, this return value (dwEventResult) is evaluated to determine whether or not this traffic may continue. For instance, the traffic may not continue if it is blocked by an active security rule enforced by the client security module. If the traffic (i.e., packet) is not blocked, the second condition on line 20 (MSGEVT_RETURN_VPN) looks for events (e.g., connection to a particular server address) that trigger a connection to an integrity server. If this condition indicates that the current event should trigger a connection to an integrity server, then the OpenVPNConn call on line 22 causes a connection to the integrity server to be opened.

The following module illustrates a particular rule which serves to associate a request for connection to a specific server address (e.g., a specific corporate server) with a connection to an integrity server related to (or associated with) this server address. In the currently preferred implementation, the subclass TRuleBasicVPN implements a number of rules, including the rule for connection to an integrity server which is described below:

```
1:  class TRuleVPNConnect: public TRuleBasicVPN
2:  {
3:       ...
4:
5:       BOOL wantsEvent(const TEvent &e)
6:       {
7:           switch(e.dwEventMsg)
8:           {
9:               case MSGEVT_SITE_CONNECT:
10:                  return IsTriggered( );
11:              case MSGEVT_NETWORK_VPN_OBSERVE:
12:                  return (!! dwPolicyID);
13:              default:
14:                  return FALSE;
15:          }
16:      }
17:      void execute(TEvent &e, DWORD &rr)
18:      {
19:          rr = MSGEVT_RETURN_OK;
20:          PMSGEVT_INFO pMEInfo = (PMSGEVT_INFO) e.pData;
21:          switch(e.dwEventMsg)
22:          {
23:              case MSGEVT_SITE_CONNECT:
24:                  if ((pMEInfo->pINetAddr->wPort == htons (wPortVPN)) &&
25:                      (ContainsIPAddr(pMEInfo->pINetAddr->dwIPAddr)) &&
26:                      IsTriggered( )
27:                      )
```

```
28:                     {
29:                         pMEInfo->dwRuleId = dwMapID;
30:                         if (appName.size( ))
31:                         {
32:                             char cLongName[256];
33:                             char cShortName[256];
34:                             if (RulesGetPropString(e.dwProgramId,
PROPID_FILENAME, cLongName, sizeof(cLongName)))
35:                             {
36:                                 ExtractFileBase(cLongName,
cShortName, sizeof(cShortName));
37:                                 if (!stricmp(appName.c_str( ),
cShortName))
38:                                     rr = MSGEVT_RETURN_VPN;
39:                             }
40:                             else
41:                                 rr = MSGEVT_RETURN_VPN;
        // couldn't get app name; trigger anyway to be safe
42:                         }
43:                         else
44:                             rr = MSGEVT_RETURN_VPN;
45:                     }
46:                     break;
47:             case MSGEVT_NETWORK_VPN_OBSERVE:
48:                     AddObserve( e.dwId );
49:                     break;
50:             default:
51:                     break;
52:         }
53:     }
54:
55:     ...
56: };
```

The above TRuleVPNConnect function includes two methods: wantsEvent and execute. The wantsEvent method, which commences on line 5 above, determines whether or not a particular event is one that is of interest to this particular rule. For instance, a TriggerEvent (such as that at line 17 of the above WSockHandleMsg function) may be evaluated. If the event is of interest, wantsEvent will trigger the execute method of this function. At lines 9-10 above, the wantsEvent method looks for a MSGEVT_SITE_CONNECT event. If this value (MSGEVT_SITE_CONNECT) is true (e.g., because the event is a socket connection attempting to make an outgoing connection), the execute method is invoked to handle this particular event.

When invoked as described above, the execute method compares the destination address of the trigger event (site connect event) with the destination addresses contained in the rules. The execute method receives the parameters TEvent &e, DWORD &rr as input, as shown at line 17. These parameters include information about the trigger event, including, for instance, the destination IP address of an attempt to make an outgoing connection. At lines 19-20, the parameter rr is initialized and information about the event is copied into an internal data structure. After initialization, a switch statement at line 21 looks for the presence of particular conditions. Of particular interest is the case arm of the switch statement commencing at line 23 above (case MSGEVT_SITE_CONNECT:). At lines 24-26, the port and IP address of the incoming trigger event are compared to the port and IP address values that are held inside the rule. The isTriggered ( ) call at lines 25-26 is an integrity check to verify that this trigger event is comparing addresses. If there is a match of addresses and the integrity check is satisfied, then additional information is obtained. For example, at line 34 above, the file name of the process (or application) initiating the connection is obtained and stored. Whether or not this information is obtained, a message event (MSGEVT_RETURN_VPN) is returned at lines 38-44 if the addresses match. This message event indicates that a connection should be initiated to the integrity server.

The above WSockHandleMsg function may also call other functions when a trigger event occurs. One function that may be called is the following RulesEventHandler function, which examines particular packets (events) to determine whether or not such packet is blocked by a security rule of any active security policy:

```
 1: DWORD WINAPI RulesEventHandler(
 2:             DWORD dwEventMsg,      // Event message #
 3:             DWORD dwProcessId,     // ID of the originating
                                          process
 4:             DWORD dwId,            // ID of the
                                          originating object
 5:             DWORD dwAnchor,        // Used by
                                          external handler
 6:             LPVOID pData,          // Additional data
                                          (based on message)
 7:             DWORD dwDataLen)       // Lengths (of
                                          additional data)
 8: {
 9:     TEvent e = {0};
10:     DWORD res, res2;
11:     BOOL bVPN = FALSE;
12:
13:     ...
14:
15:     _try
16:     {
17: //              res = MSGEVT_RETURN_OK;
18:         res = MSGEVT_RETURN_NOOP;
19:
20:         // Start at end and work back to default policy because only
21:         // default policy will have "ask" setting
22:         LPPOLICY pPolicy = g_pPolicyDB->GetTail( );
```

```
23:
24:             // lock policy list
25:             while ( pPolicy )
26:             {
27:                     // KKNOTE 12.1 Check and see if the policy
                        is active
28:                     if (!pPolicy->GetStatus( ))
29:                     {
30:                             pPolicy = (LPPOLICY)pPolicy->pPrev;
31:                             continue;
32:                     }
33:
34:                     ...
35:
36:                     TRule *rule = (TRule*)table->data.pHead;
37:                     while (rule)
38:                     {
39:                             _try
40:                             {
41:                                     if (rule->appliesTo( e ))
42:                                     {
43:                                             e.extra.dwCode = 0;
44:                                             e.extra.dwAlertId = 0;
45:                                             if (e.extra.cDesc[0])
46:                                                     memset(e.extra.cDesc, 0, sizeof(e.extra.cDesc));
47:                                             rule->execute( e, res2 );
48:
49:                                             ...
50:
51:                                     }
52:                                     // on failure, don't ask any more rules
53:                                     if ((res & MSGEVT_MASK_RETURN) != MSGEVT_RETURN_OK &&
54:                                             (res & MSGEVT_MASK_RETURN) != MSGEVT_RETURN_NOOP)
55:                                     {
56:                                             bStop = TRUE;
57:                                             break;
58:                                     }
59:                             }
60:                             _except(RulesHandleException( &e, rule, GetExceptionCode( ), GetExceptionInformation( ) ))
61:                             {
62:                                     //
63:                             }
64:                             rule = (TRule*) rule->pNext;
65:                     }
66:
67:                     ...
68:
69:                     pPolicy = (LPPOLICY) pPolicy->pPrev;
70:             } // while ( pPolicy )
71:
72:             RulesSetCurrentContext( dwOldContext );
73:             if (bVPN)
74:                     res |= MSGEVT_RETURN_VPN;
75:             return res;
76:     }
77:             _except( RulesHandleException( &e, NULL, GetExceptionCode( ), GetExceptionInformation( ) ))
78:             {
79:                     RulesSetCurrentContext( dwOldContext );
80:                     return MSGEVT_RETURN_NOOP;
81:             }
82: }
```

As shown at lines 2-7 above, the RulesEventHandler function receives information about the particular packet causing the message event (trigger event) as input. This information includes identification of the originating process and object. The RulesEventHandler function analyzes each of the rules of each of the active security policies, one at a time, to determine if any rule indicates that the packet causing the message event should be blocked. The outer while loop shown at line 25 above goes through all security policies, starting with the last policy. The if condition at lines 28-32 gets the status of a policy. If the status of a policy is inactive, then that policy is skipped and the next policy is examined.

If, however, the status of a policy is active, the applicability of rules of that policy to the event is examined as hereinafter described. An inner while loop commencing at line 37 examines each of the rules of a policy in turn. At line 41 a check is made (if (rule->appliesTo(e)) to determine if a rule may apply to the current event that is being examined. If the rule does apply to this type of event, then the execute method is invoked, as shown at line 47, and the rule of the current policy is executed against this event. As the execute method is within an inner loop, it may be executed against other rules of the current policy as well as rules of other policies. At lines 64-65, the inner loop ends examination of a rule and proceeds back to examine the next rule (if any). As shown at lines 69-70 above, after all rules of a policy have been examined the outer while loop ends, and the next policy (if any) is examined. After all policies have been examined, state information is updated as shown at line 72. As shown at lines 73-75, a connection to an integrity server may be initiated if a particular condition (if (bVPN)) is satisfied. However, the general role of this function is to arbitrate multiple security policies by sequentially examining rules of active policies to determine whether to allow or disallow particular traffic. If any of the rules of any of the (active) policies require the traffic to be blocked, then the function returns a result (e.g., res2 as shown at line 47) indicating that the traffic (packet) should be blocked.

Another function handles the arbitration of security policies by accessing one feature (or rule) of all active policies and arbitrating the values of multiple policies by merging the values down to a single value. This process of merging values of active security policies is handled by the following RulesGetPropDWord function:

```
/////////////////////////
1:  // RulesGetPropDWord
2:  BOOL RulesGetPropDWordAllInt( HCONTEXT hContext, DWORD propid, LPDWORD lpDW)
3:  {
4:      std::vector<LPPOLICY> policies;
5:      GetActivePolicies(&policies);
6:      if (policies.empty( ))
7:          return FALSE;
8:      DWORD dwTemp;
9:      DWORD srvBlkLan, secLevLan, srvBlkExt, secLevExt;
```

-continued

```
10:     if (RulesInitialValue(propid, &dwTemp))
11:         *lpDW = dwTemp;
12:     if (propid == PROPID_SECURITYINFO)
13:     {
14:         srvBlkLan = SRVBLK_LAN(dwTemp);
15:         secLevLan = SECLEV_LAN(dwTemp);
16:         srvBlkExt = SRVBLK_EXT(dwTemp);
17:         secLevExt = SECLEV_EXT(dwTemp);
18:     }
19:     BOOL result = FALSE;
20:     DWORD securityInfo;
21:     DWORD dwFwalertSuppress;
22:     DWORD dwLockStrength;
23:     BOOL defNetworkStatusResult = FALSE;
24:     ALL_SECLEV_SETTINGS      settings;
25:     BOOL customSecinfoResult = FALSE;
26:     if ((propid == PROPID_CURRENT_SECSIZE) || (propid == PROPID_CUSTOM_SECSIZE))
27:         settings.Initialize( );
28:     for (vector<LPPOLICY>::iterator i = policies.begin( ); i != policies.end( ); i++)
29:     {
30:         LPPOLICY pPolicy = *i;
31:         if (!pPolicy)
32:             continue;
33:         switch(propid)
34:         {
35:             case PROPID_LOCK_STRENGTH:
36:                 case PROPID_MANAGERLOCK:
37:                     dwLockStrength = GetInternetLockProperty( pPolicy, propid );
38:                     if (dwLockStrength == LSL_EMERGENCY) // Can't be more restrictive than this - return now
39:                     {
40:                         *lpDW = dwLockStrength;
41:                         return TRUE;
42:                     }
43:                     else if (dwLockStrength > *lpDW)
44:                         *lpDW = dwLockStrength;
45:                     result = TRUE;
46:                     break;
47:                 case PROPID_CURRENT_SECSIZE:
48:                 {
49:                     ALL_SECLEV_SETTINGS tempSettings;
50:                     customSecinfoResult =
51:                         GetCustomSecuritySettings( pPolicy, &tempSettings );
52:                     if (!customSecinfoResult)
53:                         continue;
54:                     result = TRUE;
55:                     settings.SetCurrentSecInfo(&tempSettings);
56:                     *lpDW = settings.GetCurrentSecSize( );
57:                     break;
58:                 }
59:                 case PROPID_CUSTOM_SECSIZE:
60:                 {
61:                     ALL_SECLEV_SETTINGS tempSettings;
62:                     customSecinfoResult =
63:                         GetCustomSecuritySettings( pPolicy, &tempSettings );
64:                     if (!customSecinfoResult)
65:                         continue;
66:                     result = TRUE;
67:                     settings.SetCustomSecInfo(&tempSettings);
68:                     *lpDW = settings.GetCustomSecSize( );
69:                     break;
70:                 }
71:                 case PROPID_SECURITYINFO:
72:                     securityInfo = GetSecurityPropDWord( pPolicy, propid );
73:                     srvBlkLan = max(SRVBLK_LAN(securityInfo), srvBlkLan);
74:                     secLevLan = max(SECLEV_LAN(securityInfo), secLevLan);
75:                     srvBlkExt = max(SRVBLK_EXT(securityInfo), srvBlkExt);
76:                     secLevExt = max(SECLEV_EXT(securityInfo), secLevExt);
77:                     *lpDW = SEC_INFO(srvBlkLan, secLevLan, srvBlkExt, secLevExt);
78:                     result = TRUE;
79:                     break;
```

```
 80:            case PROPID_FWALERT_SUPPRESS:
 81:                    // Don't suppress if any policy doesn't suppress
 82:                    dwFwalertSuppress = GetFWActionPropDWord( pPolicy,
propid );
 83:                    *lpDW &= dwFwalertSuppress;
 84:                    result = TRUE;
 85:                    break;
 86:            case PROPID_OBSERVEFLAGS:
 87:            case PROPID_LOGFLAGS:
 88:                {
 89:                    DWORD dwFlags = 0;
 90:                    BOOL partialResult = pPolicy->GetPropDWord( propid,
dwFlags );
 91:                    if (!partialResult)
 92:                        continue;
 93:                    *lpDW |= dwFlags;
 94:                    result = TRUE;
 95:                    break;
 96:                }
 97:            case PROPID_ALERTFLAGS:
 98:                {
 99:                    DWORD dwFlags = 0;
100:                    BOOL partialResult = pPolicy->GetPropDWord( propid,
dwFlags );
101:                    if (!partialResult)
102:                        continue;
103:                    *lpDW &= dwFlags;
104:                    result = TRUE;
105:                    break;
106:                }
107:            case PROPID_OBSERVEINTERVAL:
108:                {
109:                    DWORD dwInterval = 0;
110:                    BOOL partialResult = pPolicy->GetPropDWord( propid,
dwInterval );
111:                    if (!partialResult)
112:                        continue;
113:                    if (! *lpDW )
114:                        *lpDW = dwInterval;
115:                    else if ((dwInterval > 0) && (dwInterval < *lpDW))
116:                        *lpDW = dwInterval;
117:                    result = TRUE;
118:                    break;
119:                }
120:            }
121:        }    // end policy for loop
122:    return result;
123: }
```

The above RulesGetPropDWord function examines values of particular properties (or rules) across all of the active policies and arbitrates these values. The function examines DWORD (i.e., 32 bit) property values (as shown at line 2 above) of particular properties (i.e., security rules) and returns a merged 32-bit value (LPDWORD lpDW) generated by arbitration of these property values. As shown at lines 4-7, all active policies are collected, and a check is made to verify that there is at least one active policy. Lines 10-27 provide for initialization of the parameters of the function. Of particular interest at line 10 above, an initial starting value for a particular rule (or property) is established. In following segments of this function, this initial value is compared to the value of each active policy and a merged (or arbitrated) result of such comparison(s) is retained as the result value (LPDWORD lpDw) as hereinafter described.

The process of examining the value of each of the policies begins with the for statement shown at line 28 above. For a particular rule (property), this for statement loops through each of the policies and compares the value in each of the policies to determine and return a merged (i.e., arbitrated) value for the property. At lines 30-31 an individual policy is selected and a check is made to determine the policy is valid. The switch statement commencing at line 33 examines a particular property identified by a property identifier (propid). The following conditions (cases) of the switch statement provide for different types of properties (rules) to be handled in different ways. One example, which is shown at lines 35-46, involves examination of a pass/lock rule. In the currently preferred embodiment, a pass/lock rule may be utilized to block one or more applications from accessing the Internet, while possibly permitting other applications to access the Internet (i.e., pass through the block). At line 37, the pass/lock value for the current policy being examined in this loop is obtained. As shown at line 38, if this current value is the "emergency" value, which is the maximum (strongest) value associated with this rule, the emergency value is returned and the loop is ended (as shown at lines 40-41) as no values of other policies are higher (stronger) than this value. This is an example of the previously-described approach of the currently preferred embodiment of ordering values associated with a particular security rule from lowest to highest and adopting the highest value of any of the active policies being examined. Otherwise, as shown at lines 43-45, the value of the current policy is compared to the current result value (which may be either an initial setting or a result value from a previously-examined policy). If the property value of the current policy is higher (i.e., stronger) than the current result value (if dwLockStrength >*lpDW) the property value of the current policy is retained as the result value (*lpDW=dwLockStrength lpdw). In this manner the highest (strongest) value found in any of the active policies is retained as the result value.

Other case arms of the switch statement of this function provide for a similar process of examination for different properties or rules. Several other properties also have ordered values and the highest ordered value is selected in the same manner as described above. However, certain other properties or rules are handled differently. For instance, the alert flags property value (PROPID_ALERTFLAGS), as shown at line 97, is a set of bit mask flags. In this case, the alert flags values associated with all active policies are concatenated together. In other words, the result value is created by ANDING together all of the alert flags of all active policies. However, in the case of certain other list values, such as a list of trusted machines, the list values of each of the policies may be intersected to create the result value, as desired.

After one or more properties of all active policies have been examined in the manner described above, this RulesGetPropDword function returns as a result merged (i.e., arbitrated) values for the policies that have been examined. Generally, each result value which is returned by this function is used to set a firewall rule. When firewall rules are reset (e.g., upon activation of a new security policy on a client device as previously described), a set of firewall properties (i.e., firewall rules or settings) are typically examined using this function in order to create a result set of values which are used to configure the firewall. The firewall may then apply these settings to permit or block particular communications to and from the client device.

While the invention is described in some detail with specific reference to a single-preferred embodiment and certain alternatives, there is no intent to limit the invention to that particular embodiment or those specific alternatives. Those skilled in the art will appreciate that modifications may be made to the preferred embodiment without departing from the teachings of the present invention. In particular, while the currently preferred embodiment of the present invention provides for arbitration (or merging) of multiple security policies by selecting the most restrictive value of any active policy for use in the merged policy in most cases, this is only one of a number of possible choices that may be made as to how to reconcile two or more security policies. For example, two security policies may, if desired, be arbitrated by adopting all of the settings of one policy. In another situation, arbitration of multiple policies might involve selecting the least restrictive value for one or more security settings. For instance, in the currently preferred embodiment of the present invention, administrators have the option of configuring a corporate security policy that permits users to include home networks or other local networks or resources in the local zone (i.e., as trusted). However, an administrator may alternatively require application of the local zone definition specified in the corporate security policy. Those skilled in the art will appreciate that various implementation-specific choices may be made regarding how to reconcile two or more security policies to provide appropriate security to both organizations and individuals.

What is claimed is:

1. A method for a particular device to apply a flexible security policy that is automatically adjusted over time as required for connection to different networks, the method comprising:

(a) receiving a request from the particular device for a connection to a particular network, said particular device applying an initial security policy selected from a plurality of security policies available for governing connections, each security policy governing connections with a specific set of constraints;

(b) based on said particular network and said plurality of security policies available to said particular device, determining a current merged policy to apply to said particular device for governing said connection to said particular network, by merging said initial security policy with at least one other of the security policies available for governing connections;

(c) allowing said connection to said particular network to proceed with said current merged policy applied to said particular device; and (d) repeating steps (a)-(c) for a plurality of connections to different networks, thereby automatically adjusting the security policy applied to the particular device based on the particular device's current connections.

2. The method of claim 1, wherein said step of determining a current merged policy to apply includes determining a particular security policy required for connection to said particular network.

3. The method of claim 1, wherein said step (b) includes merging a security policy previously active on said particular device and a security policy required for connection to said particular network.

4. The method of claim 1, wherein said step of determining a current merged policy to apply includes merging each security policy required for governing a connection currently open at said particular device.

5. The method of claim 1, wherein said step of determining a current merged policy to apply includes the substeps of:
examining each rule of each security policy available for governing connections; and
for each rule, determining a setting to adopt in said current merged policy based upon settings of each said security policy.

6. The method of claim 5, in which said substep of examining each rule of each security policy available for governing connections includes examining each security policy required for governing a connection currently open at said particular device.

7. The method of claim 1, wherein said step of determining a current merged policy to apply includes evaluating each security setting of said plurality of security policies.

8. The method of claim 1, wherein said plurality of security policies available to said particular device includes security policies available through connection to a network.

9. The method of claim 1, wherein said plurality of security policies available for governing connections includes at least one security policy which is user configurable.

10. The method of claim 1, wherein said step of determining a current merged policy to apply includes locating a particular security policy required for connection to said particular network.

11. The method of claim 10, wherein said step of locating a particular security policy required for connection to said particular network includes downloading said security policy from said particular network.

12. The method of claim 1, wherein said step of allowing said connection to said particular network to proceed with said current merged policy applied to said particular device, includes updating firewall settings on said particular device based upon said current merged policy.

13. The method of claim 1, further comprising:
upon disconnection of said particular device from said particular network, determining a revised security policy to apply.

14. The method of claim 13, wherein said step of determining a revised security policy to apply includes determining said revised security policy based upon security policies required for governing connections remaining open at said particular device.

15. The method of claim 1, wherein said current merged security policy comprises a set of enforcement rules governing access to and from said particular device.

16. A method for a device to create and maintain a flexible security policy that is automatically revised over time as required to allow connection to a plurality of networks, the method comprising:
providing a security enforcement module at a device, said security enforcement module enforcing an existing initial security policy;
upon receipt of a request for connection of said device to a new network, determining at that moment in time a particular security policy required to be enforced to allow connection of said device to said new network;
generating from existing security policies a revised security policy for enforcement by said security enforcement module, said revised security policy based upon merging said particular security policy and said initial security policy so that security settings currently appropriate for the device are activated and security settings currently inappropriate for the device are inactivated;
applying said revised security policy to said security enforcement module to allow said device to connect to said new network with appropriate security; and
as the device connects to different networks, automatically regenerating the revised security policy applied to the particular device based on the particular device's then-current connections.

17. The method of claim 16, wherein said initial security policy includes a plurality of rules governing access at said device to be enforced by said security enforcement module.

18. The method of claim 16, wherein said initial security policy includes an individual security policy adopted by a user of said device.

19. The method of claim 16, wherein said step of determining a particular security policy required to be enforced includes identifying said particular security policy from a plurality of security policies available at said device.

20. The method of claim 16, wherein said step of determining a particular security policy required to be enforced includes downloading said particular security rules from said new network.

21. The method of claim 16, wherein said step of generating a revised security policy includes the substeps of:
examining each rule of said initial security policy and said particular security policy; and
for each rule, determining a setting to adopt for said rule based upon settings of said initial security policy and said particular security policy.

22. The method of claim 21, in which said substep of determining a setting to adopt for said rule includes adopting the most restrictive setting for said rule.

23. The method of claim 21, in which said substep of determining a setting to adopt for said rule includes adopting a setting based upon a pre-selected ordering of said settings.

24. The method of claim 21, in which said substep of determining a setting to adopt for said rule includes adopting a setting based upon intersecting permissive list settings.

25. The method of claim 21, in which said substep of determining a setting to adopt for said rule includes adopting a setting based upon unioning restrictive list settings.

26. The method of claim 16, wherein said initial security policy includes a revised security policy previously generated and applied to said security enforcement module.

27. The method of claim 16, wherein said step of applying said revised security policy to said security enforcement module includes updating firewall settings of said security enforcement module on said device based upon said revised security policy.

28. The method of claim 16, further comprising: upon disconnection of said device from said new network, determining a revised security policy to apply based upon security policies required to be enforced as a result of network connections remaining active at said device.

29. The method of claim 16, further comprising: upon disconnection of said device from said new network, applying said initial security policy to said security enforcement module.

30. A system for regulating access at a computing system as required for connection to a network, the system comprising:
a connection manager for receiving a request for connection to said network at said computing system and determining at that point in time an initial access policy which is required for connection to said network;
a rules engine for automatically generating and repeatedly regenerating a current access policy for regulating access at said computing system as required for connection to different networks, so that security rules currently applied to the computing system are based on the computing system's current connections, said current access policy being generated and repeatedly regenerated by merging a plurality of existing access policies available at said computing system, so that from time to time the rules engine automatically activates security rules that are required for current connections and deactivates security rules that are no longer required for current connections; and
a security enforcement module for applying said current access policy for regulating access at said computing system.

31. The system of claim 30, wherein said rules engine generates a current access policy by merging an access policy previously active at said computing system and an access policy required for connection to said network.

32. The system of claim 30, wherein said rules engine generates a current access policy by merging each access policy required for connection to each network to which said computing system is currently connected.

33. The system of claim 32, wherein each network to which said computing system is currently connected includes said network to which said computing system has requested a connection.

34. The system of claim 30, wherein said connection manager includes a communication driver for identifying requests for connection to a network.

35. The system of claim 30, wherein said rules engine generates a current access policy by performing the steps of:
examining each rule of each access policy available at said computing system; and
for each rule, determining a setting to adopt in said current access policy based upon settings of each said available access policy.

36. The system of claim 35 in which said step of determining a setting to adopt in said current access policy includes considering only available access policies required for connections currently open at said computing system.

37. The system of claim 35, wherein said rules engine generates a current access policy by comparing each security setting of each rule of said plurality of available access policies.

38. The system of claim 30, wherein said connection manager determines an access policy which is required for connection to said network by downloading said access policy from said network.

39. The system of claim 30, wherein said security enforcement module includes a firewall application for selectively blocking access at said computing system based upon said current access policy.

40. The system of claim 30, further comprising:
a supervisor module for verifying a computing system is applying an access policy required for connection to network prior to allowing said connection to said network.

41. The system of claim 30, wherein said rules engine determines a revised access policy to apply upon disconnection of said computing system from said network.

42. A method for automatically and continually adjusting enforcement rules of a security enforcement module at a device as required from time to time to enable access to a plurality of different networks with appropriate security settings, the method comprising:
providing an enforcement module at said device, said enforcement module applying an initial set of enforcement rules already existing at said device;
upon receiving a trigger event comprising a request for access to a given network, determining particular enforcement rules required to be applied by said enforcement module to enable access to said network;
responsive to said trigger event, automatically adjusting said initial set of enforcement rules by merging said initial set of enforcement rules with said particular enforcement rules required to enable access to said network;
applying said adjusted enforcement rules to said enforcement module to enable said device to access said network with security settings that are appropriate at that moment in; and
as the device connects to different networks, automatically readjusting the enforcement rules being applied to enable said device to access different networks with security settings that are appropriate at that moment in time.

43. The method of claim 42, wherein said step of determining particular enforcement rules to apply includes locating said particular enforcement rules from a plurality of enforcement rules available to said enforcement module.

44. The method of claim 42, wherein said step of determining particular enforcement rules required to enable access to said network includes downloading said particular enforcement rules from said network.

45. The method of claim 42, wherein said step of merging said initial set of enforcement rules with said particular set of enforcement rules includes determining settings to adopt for each rule by evaluating settings of said initial set of enforcement rules and settings of said particular enforcement rules.

46. The method of claim 45, in which said step of determining settings to adopt for each rule includes adopting the more restrictive setting of said initial set of enforcement rules and said particular enforcement rules.

47. The method of claim 45, in which said step of determining settings to adopt for each rule includes adopting settings based upon a pre-selected ordering of said settings.

48. The method of claim 45, in which said step of determining settings to adopt for each rule includes adopting settings based upon intersecting list settings for rules that are permissive.

49. The method of claim 45, in which said step of determining settings to adopt for each rule includes adopting settings based upon concatenating list settings for rules that are restrictive.

50. The method of claim 42, further comprising:
providing a security supervisor on said network, said security supervisor enforcing compliance with particular enforcement rules required to enable access to said network.

51. The method of claim 42, further comprising:
upon termination of access to said network by said device, applying said initial set of enforcement rules for enforcement by said enforcement module.

* * * * *